United States Patent
Ku et al.

(10) Patent No.: US 6,424,925 B1
(45) Date of Patent: Jul. 23, 2002

(54) CIRCUIT AND METHOD FOR DETECTING A TONE SIGNAL

(75) Inventors: Man Ho Ku, Milpitas; Wai-Hung Leung, Cupertino; Po-Sheng Chou, San Jose; Ying-chang Chen, Cupertino, all of CA (US)

(73) Assignee: Integrated Telecom Express, Inc., San Jose, CA (US)

( * ) Notice: Subject to any disclaimer, the term of this patent is extended or adjusted under 35 U.S.C. 154(b) by 0 days.

(21) Appl. No.: 09/387,657

(22) Filed: Aug. 31, 1999

(51) Int. Cl.$^7$ .............................................. G01R 13/00

(52) U.S. Cl. ....................... 702/74; 342/125; 380/238; 708/7; 708/312

(58) Field of Search .............................. 702/72, 74, 75, 702/76, 77, 79, FOR 107, FOR 108, FOR 109, FOR 110; 324/76.57

(56) References Cited

U.S. PATENT DOCUMENTS

| | | | | |
|---|---|---|---|---|
| 4,021,653 A | * | 5/1977 | Sharp et al. | 708/312 |
| 4,164,036 A | * | 8/1979 | Wax | 702/74 |
| 4,302,817 A | | 11/1981 | Labedz | 364/724 |
| 4,326,256 A | * | 4/1982 | Furumoto | 702/74 |
| 4,499,550 A | * | 2/1985 | Ray, III et al. | 708/7 |
| 4,513,385 A | | 4/1985 | Muri | 364/572 |
| 4,654,705 A | * | 3/1987 | Forbes et al. | 380/238 |
| 5,119,322 A | * | 6/1992 | Stroobach | 708/312 |
| 5,220,332 A | * | 6/1993 | Beckner et al. | 342/125 |
| 5,274,579 A | | 12/1993 | Nelson et al. | 364/724 |
| 5,850,438 A | | 12/1998 | Braams et al. | 379/386 |

OTHER PUBLICATIONS

Apollo 1 Chipset, Apollo 1 Chipset Product Data Sheet Preliminary Version 1.1, 6 pp., Dec. 1998.

SAM (Scalable ADSL Modem) Chipset, Host Based G.lite ADSL Chipset Optimized for PCs, Scalable ADSL Model Chip Set Product Data Sheet, Preliminary Version 1.1, 3 pp., Dec. 1998.

*Primary Examiner*—John S. Hilten
*Assistant Examiner*—John Le
(74) *Attorney, Agent, or Firm*—Law +

(57) ABSTRACT

A tone detector includes at least one circuit (hereinafter "single phase reference matcher") that not only performs a convolution of an input signal with a reference signal, but also compares the result of convolution with a threshold to determine if there is a match, and if so drives a signal active indicating that tone is present. If there is no match, another circuit (hereinafter "phase shifter") delays the reference signal by a fraction (e.g. ⅛) of the measuring period, thereby to introduce a phase shift (e.g. π/8) between the input signal and the reference signal. The "single phase reference matcher" again performs the just-described operation, this time with a delayed reference signal, and repeats the operation as often as necessary (e.g. eight times) to cycle through the entire measuring period, thereby to ensure that tone (if present in the input signal) is detected irrespective of phase, during one of the operations. The smaller the phase shift, the greater the number of times the operation is repeated, and vice versa. A tone detector of the type described herein can include more than one "single phase reference matcher," each of which performs one of the above-described operations in parallel, thereby to reduce the total time required to perform all operations. The number of samples over a measurement period is selected to minimize the noise, e.g. by selecting a number based on the input frequency and difference in frequency with the nearest adjacent frequency at which another tone may be present.

20 Claims, 17 Drawing Sheets

Apollo 2 Chipset "Full Rate and G–lite Hardware–Based Controllerless ADSL Chipset for PCs", Apollo 2 Chipset Product Data Sheet Preliminary Version 1..2, 5 pp., Feb. 1999.

I90816–Scalable ADSL Modem Digital Chip, I90816 Product Data Sheet Preliminary Version 1.1, 7 pp., Feb. 1999.

http://www.techweb.com/se/directlink.cgi?EBN19990614S0007, Integrated Telecom rolls out G.Lite/ADSL chipset, 2 pp., Jun. 14, 1999.

http://web.ansi.org/public/news/1998mar/adsl_4html, Industrial Leaders to Conduct Standards–Based ADSL Interoperability Testing, 2 pp., 1999.

http://www.forbes.com/asp/printStory.asp?HTTP://WWW.FORBES.COM/T . . . /FEATB.HT, The RBOCs' secret weapon:DSL technology looks poised to have a big year in 1999 and that's good news for Aware Inc., 4 pp., 1998.

I80134–ADSL Analog Front End, I80134 Product Data Sheet Preliminary Version 1.1, 5 pp., Dec. 1998.

* cited by examiner

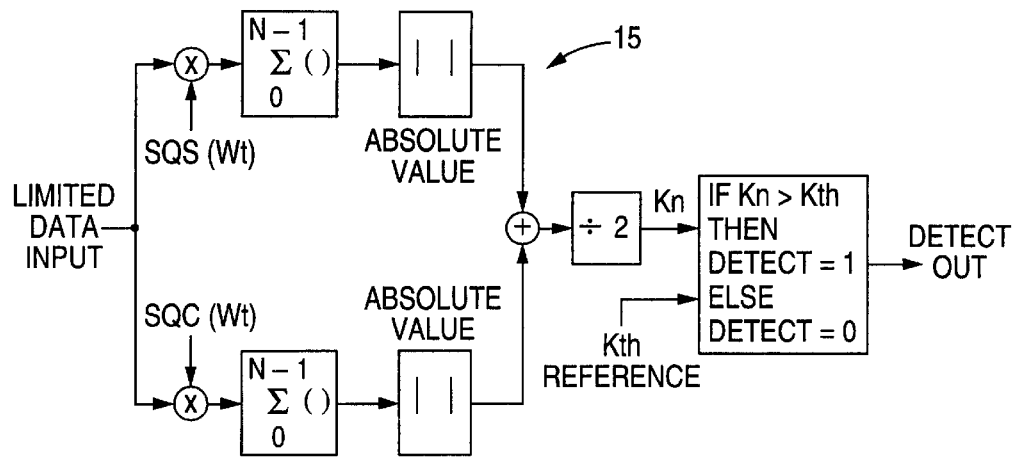
FIG. 1D
(PRIOR ART)
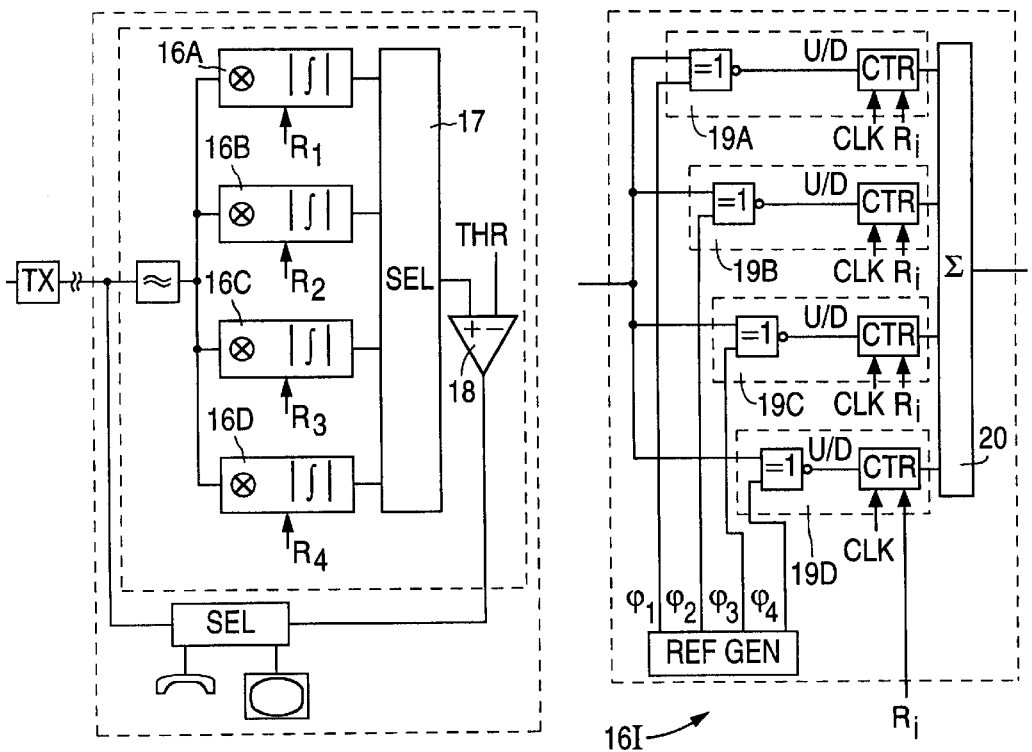
FIG. 1E
(PRIOR ART)
FIG. 1F
(PRIOR ART)

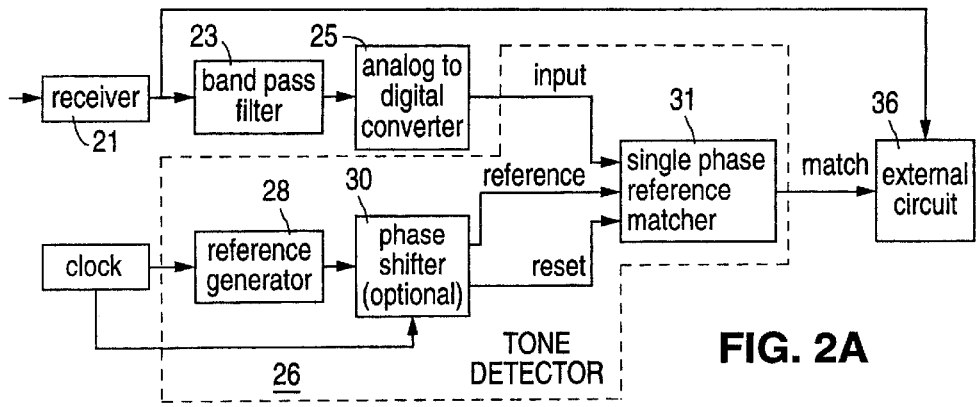
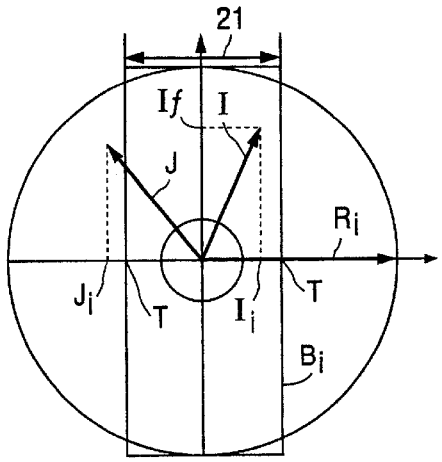
FIG. 2A
FIG. 2C
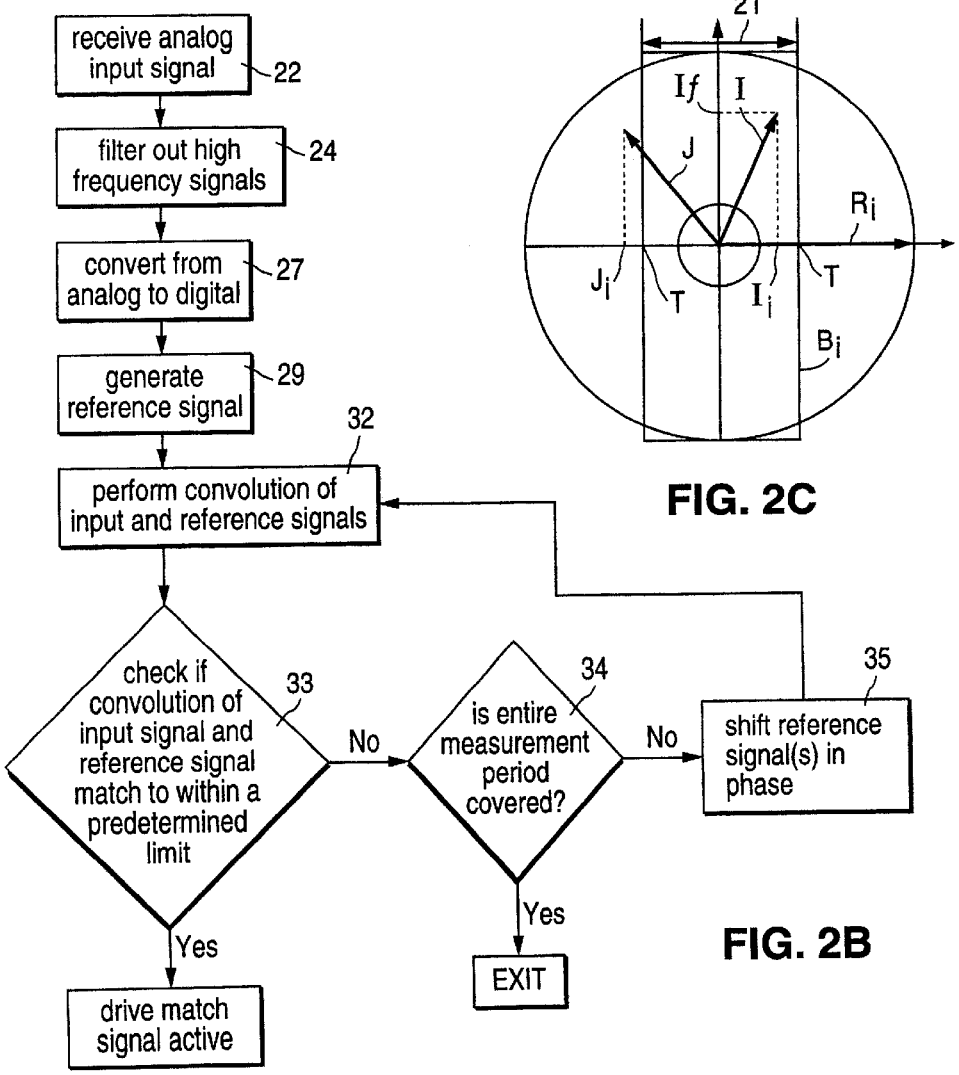
FIG. 2B

PHASE SHIFTER 63

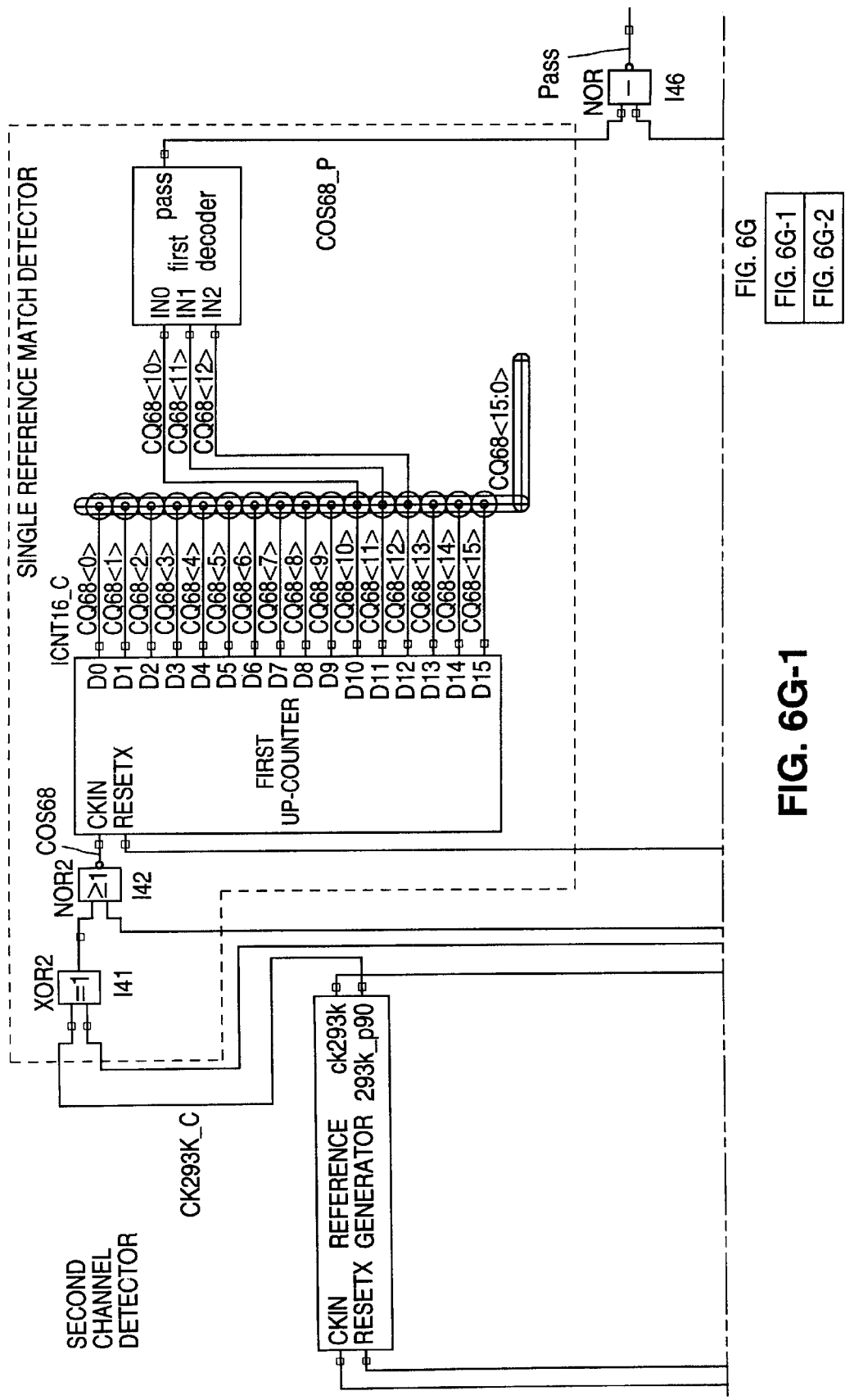

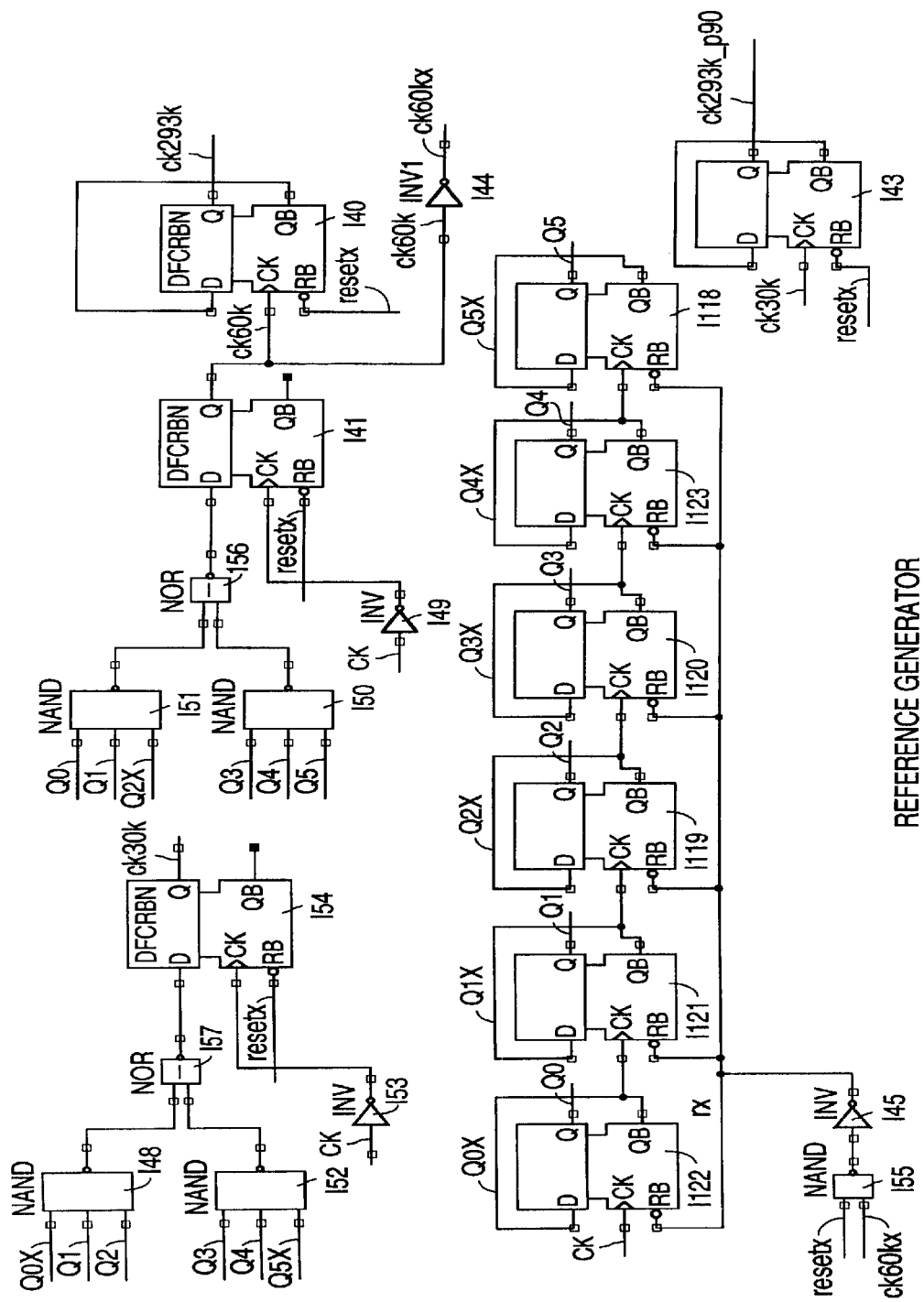
FIG. 6H REFERENCE GENERATOR

CIRCUIT AND METHOD FOR DETECTING A TONE SIGNAL

BACKGROUND

Several prior art communications systems, such as the paging system (FIG. 1A) described in U.S. Pat. No. 5,274,579 (granted to Nelson et al, and which is incorporated by reference herein in its entirety), include a circuit (commonly called "tone detector") 10 to detect the presence of a signal (also called "tone signal") that has a known frequency. As described therein, an analog circuit 11 (FIG. 1B) can be used to convolute (multiply and accumulate) input signal with analog sine and cosine reference signals, to obtain two components Vos and Voc (FIG. 1C). The two components are then squared (in devices 12A and 12B of FIG. 1B), and the squares summed (in summer 13), followed by a square-root operation on the sum (in device 14) to obtain the magnitude Vo of the tone signal, and the magnitude Vo is compared with a threshold Vr (FIG. 1B) in a threshold detector 15 to determine if the tone signal is present. Note that a tone signal is detected in the example illustrated in FIG. 1C even though Vos and Voc are less than Vr, because Vo is greater than Vr. In FIG. 1C, Vm denotes the maximum magnitude possible for the input signal, and Vn denotes noise.

Another patent, U.S. Pat. No. 4,302,817 (granted to Labdez, and which is incorporated by reference herein in its entirety), describes a tone detector having an optional filter (which is preferably a low pass or band pass filter), followed by a limiter (which hard limits the signal thus converting the signal into essentially a rectangular waveform). The output of the limiter is supplied to a control logic (the circuit illustrated in FIG. 1D) which has been modeled by Nelson et al. (incorporated by reference in the above paragraph), and which uses square wave reference signals SQS (Wt) and SQS (Wt) having one of two values +1 and −1 for digital processing. Also according to Nelson et al., conventional analog multiplications were replaced by simple Boolean multiplications, conventional analog integrators were replaced by summers, the squaring functions were replaced by absolute value functions, the outputs were digitally summed, and the square root was replaced by a simple divide by two function. In actual practice, the divide by two function was generally omitted, and the output of the summer was directly compared to a threshold, to generate an output signal having a logic value.

Nelson et al. indicate that the Labdez tone detector (which includes the circuit of FIG. 1D) had increased sidelobe responses (due to the rectangular observation window), and also had increased harmonic responses, particularly third harmonic responses (due to the rectangular reference signals at the tone frequency). Yet another patent, U.S. Pat. No. 4,513,385 (granted to Muri and which is incorporated by reference herein in its entirety), describes use of a rectangular observation window that omits sampling the input signal during a predetermined time interval. Nelson et al. state that Muri's observation window is suitable for protocols having twelve evenly spaced tones between 350 Hz and 3100 Hz, but unsuitable for decoding sixty tones spaced at 2.77% frequency intervals between 280 Hz and 3100 Hz.

Still another patent, U.S. Pat. No. 5,850,438 (granted to Braams et al, and which is incorporated by reference herein in its entirety), includes a number of correlators 16A–16D (FIG. 1E) that measure the input signal during mutually displaced measuring periods. The additional correlators ensure that at least one correlator always covers the complete period during which the tone is present. A selector 17 selects one of correlators 16A–16D (depending on whichever has the largest value) to be coupled to a comparator 18 that compares the output from the correlator with a threshold to detect the presence of the tone signal. One implementation (FIG. 1F) of a single correlator 16I includes four correlating elements 19A–19D, and each correlating element includes an exclusive NOR gate that receives a reference signal and the input signal, and supplies an output signal of value "1" when both signals have equal values and otherwise supplies a "0", and this output signal controls the direction of an up/down counter. Each of the four up/down counters are coupled to an adder 20 that in turn is coupled to a comparator, for comparison of the adder's output to a threshold value (FIG. 1E).

Note that Braams' correlating elements 19A–19D (FIG. 1F) receive reference signals that have a phase difference of $\pi/4$. Braams et al. state that "[a] correlation signal substantially different from zero will be present if the input signal comprises a signaling tone with a frequency corresponding to the frequency of the reference signal. The tolerated frequency difference depends on the measuring time used. This measuring time used is defined by the time between the two subsequent reset instants of the integrators . . . A finite measuring time $T_m$ results in a rectangular window function applied to the output signal of the multipliers . . . By choosing a suitable value for the measuring time every desired frequency resolution can be obtained. Because the measuring time $T_m$ can easily be changed, the frequency resolution can easily be changed too. By using four reference signals having a phase incrementing by $\pi/4$ always a major correlation signal is generated, irrespective of the phase of the reference tone. It can be shown that the amplitude variation of the combined correlation signal as a function of the phase of the signaling tone, is not more than 10%."

See also the article entitled "A Digital Receiver for Tone Detection Applications" by Theo A. C. M. Classen and J. B. H. Park, in IEEE Transactions on Communications, Vol. Com-24, No. 12, December 1976, pp. 1291–1300.

SUMMARY

In accordance with the invention, a tone detector includes at least one circuit (hereinafter "single phase reference matcher") that not only performs a convolution of an input signal with a reference signal, but also compares the result of convolution with a threshold to determine if there is a match, and if so drives a signal active indicating that tone is present in the input signal. Therefore, the just-described circuit does not combine the results of convolution of the input signal with reference signals of multiple phases prior to comparison with the threshold. Instead, the single phase reference matcher performs in a single operation the just-described acts of convolution and comparison, to detect a match between a single reference signal and the input signal.

If there is no match, another circuit (hereinafter "phase shifter") delays the reference signal by a fraction (e.g. ⅛) of the measuring period, thereby to introduce a phase shift (e.g. $\pi/8$) between the input signal and the reference signal. The single phase reference matcher performs the just-described operation with one or more of such delayed reference signals as often as necessary (e.g. eight times) to cover the entire measurement period, thereby to ensure that tone (if present in the input signal) is detected irrespective of phase, during one of the operations. The smaller the phase shift, the greater the number of times the operation is repeated, and vice versa.

A tone detector of the type described herein can include more than one single phase reference matcher, each of which performs the above-described operation in parallel, thereby to reduce the total time required. In such a case, each of the single phase reference matcher (also called simply "phase matchers") has its output port coupled to an OR gate, and the OR gate indicates presence of tone irrespective of which of the phase matchers found the tone. For example, if the tone detector includes two phase matchers, then all the operations (to cover a measuring period) can be performed in half of the time required by having only one phase matcher. In one extreme example, the just-described operations are all performed simultaneously (by multiple phase matchers equal in number to the number of operations), so that tone is detected at the end of the measuring period.

Note that comparison between convolution with a single reference signal and a threshold can result in false detection of tone due to noise. Therefore, in one embodiment, the measuring period is deliberately selected to be long enough to include a number "c" of cycles of the input signal (at the tone frequency), to reduce noise that would otherwise be present when using a measuring period that covers a single cycle. The number "c" is chosen to suppress the contributions of tone signals at adjacent frequencies, for example by selecting c to be (Sf/$\Delta$f) or some multiple thereof, wherein $\Delta$f is the difference between the tone frequency of interest and the nearest frequency at which another tone may be present, and Sf is the sampling frequency.

BRIEF DESCRIPTION OF THE DRAWINGS

FIGS. 1A, 1B and 1D–1F illustrate circuits of the prior art for detection of tone in an input signal.

FIG. 2A illustrates, in a high-level block diagram, a tone detector in accordance with the invention.

FIG. 2B illustrates, in a flow chart, acts performed by the tone detector of FIG. 2A.

FIGS. 2C, 2D and 2F illustrate, in phase diagrams, the input signal and the reference signal, for three phase differences therebetween.

FIGS. 6A–6H illustrate, in circuit diagrams, implementation of one embodiment of a tone detector of the type illustrated in FIG. 2A.

DETAILED DESCRIPTION

Figure 1A:
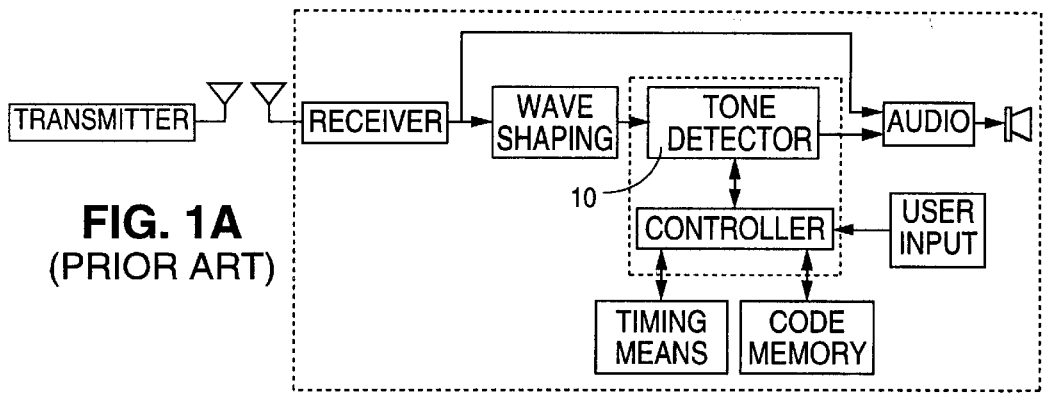

In accordance with the invention, a receiver 21 (FIG. 2A) receives an analog input signal (as illustrated by act 22 in FIG. 2B), and supplies the analog input signal to a band pass filter 23 (FIG. 2A). Filter 23 in turn filters out high and low frequency signals (as illustrated by act 24 in FIG. 2B) and supplies the filtered signal including the frequency of interest (hereinafter "predetermined frequency") to an analog to digital converter (ADC) 25. ADC 25 in turn supplies to a tone detector 26 a digital input signal (in the form of 1s and 0s ), as illustrated by act 27 in FIG. 2B.

Tone detector 26 performs a convolution between the input signal and a signal containing maximum power at the predetermined frequency (hereinafter "reference signal"), and if the result of convolution falls outside predetermined limits (also called thresholds which impose limits on the convolution result itself), then tone detector 26 drives a match signal active thereby to indicate that tone of the predetermined frequency is present in the input signal. Due to the checking of threshold on the convolution result itself, tone (even though present) may not be detected by tone detector 26 if there is a sufficient difference in phase (e.g. difference of $\pi/2$) between the input signal and the reference signal.

To find the presence of tone regardless of the phase difference between the input signal and the reference signal, tone detector 26 can use one or more of the following two techniques to detect the presence of tone: (1) simultaneously perform the just-described operations (convolution and threshold detection) on reference signals having different phases (also called "poly phase" technique), (2) successively perform the just-described operations on reference signals having different phases (also called "phase shift" technique) each convolution and threshold detection is performed one after another. In one example using the first technique, for a total of eight phases to be used in the convolution (all reference signals having the same shape but different phases), all eight convolutions and threshold detections are performed at the same time in parallel. In the just-described example, the second technique requires a maximum of eight times as much time as the first technique (because in worst case the input signal is in phase with the last reference signal; in the best case tone is detected in the first reference signal and no further convolutions are required by this technique). Therefore, the first technique requires more hardware but takes less time as compared to the second technique.

Convolution of the input signal with a reference signal having a single phase is insufficient to detect tone in the input signal because there may be a $\pi/2$ phase difference therebetween. Therefore, at a minimum two convolution (and threshold detection) operations must be performed (either successively or simultaneously). As the number of such operations is increased (by use of either or both the techniques), the frequency of tone detection approaches the theoretical limit (i.e. the threshold boxes described below overlap to approximate the threshold circle).

Moreover, in this embodiment, tone detector 26 performs the just-described operations over a measurement interval that has a duration selected to be sufficiently large to minimise the contribution of white noise. Also, the measurement interval can be selected to eliminate power from tone signals at other near by frequencies (e.g. the measurement period may be related to the difference $\Delta$f between the predetermined frequency and the nearest adjacent frequency at which another tone may be present). Such a measurement interval can be selected to be a multiple of Sf/Δf, wherein Sf is the sampling frequency. Also as described above, the noise circle reduces when the measurement interval is increased, and therefore the threshold box can be made smaller and yet be as effective as before.

Note that different embodiments of the invention can use any one or more of: the just described two techniques and the just-described measurement period (either alone or in combination thereof). Also, filter 23 (FIG. 2A) is an optional component that is not sharp enough to select the frequency of interest (at which the tone signal needs to be detected), but merely filters out power from noise and power of adjacent tone signals to avoid saturation of analog to digital converter 25 (FIG. 2A) in tone detector 26. Note further that band pass filter 23 is replaced by a low pass amplifier in an alternative embodiment. In one implementation for a tone detector, filter 23 has a central frequency of 284.8 Khz, and a bandwidth q of 0.68. Note that in other implementations, other such values can be used.

Converter 25 (FIG. 2A) can be implemented, for example by a comparator that receives the input signal and compares the input signal with voltage Vcc/2, and if the voltage of the input signal is greater than or equal to Vcc/2 the comparator generates an active signal (of value 1 for example) and otherwise generates an inactive signal (of value 0 for example). In one implementation, converter 25, filter 23, and receiver 21 can be implemented in a manner identical to the prior art (e.g. as described in relation to any one or more of U.S. Pat. Nos. 5,274,579, 4,513,385, 5,850,438 and 4,302,817). Converter 25 in one embodiment is a 1-bit converter as described herein. Moreover, filter 23 of this embodiment is any conventional filter of the type described herein.

Tone detector 26 also includes a reference generator 28 (FIG. 2A) that generates (as illustrated by act 29) a reference signal Ri (FIG. 2C) at the predetermined frequency. Reference generator 28 supplies signal Ri to an optional phase shifter 30 which if present may shift the reference signal (received from generator 28) as may be necessary to implement the above-described phase shift technique. Phase shifter 30 supplies the reference signal (with or without any phase shift) to a single phase reference matcher 31 (which is also included in tone detector 25). Single phase reference matcher 31 performs a convolution of the input signal with the reference signal (as illustrated by act 32), and also checks the result of convolution against a threshold T (FIG. 2C) to determine if there is a match (e.g. as illustrated by act 33), and if so drives a match signal active, thereby indicating to an external circuit 36 that tone is present in the input signal. Thereafter (in case of a match), tone detector 26 shuts itself off (e.g. by zeroing out a signal provided by the clock), to avoid adding noise to the signal being supplied directly from receiver 21 to external circuit 36 via line 37.

Next, external circuit 36 uses the signal from receiver 21 (FIG. 2A) in the normal manner, and can be any circuit that needs to know that tone is present, e.g. any circuit of the type described in any one or more of U.S. Pat. Nos. 5,274,579, 4,513,385, 5,850,438 and 4,302,817 each of which is incorporated by reference herein in its entirety. In one embodiment, external circuit 36 includes a modulator and demodulator (also called "modem") for use in connecting a client personal computer (PC) to the Internet, in accordance with the standard "ADSL," as described in, for example, the document entitled "Asymmetric Digital Subscriber Line (ADSL) Metallic Interface" available from ANSI TI.413-1995 (note: ANSI TI.413 Issue 2 was released Sep. 26, 1997) available electronically at their web site www.ansi.org or in print form from Global Engineering Documents, 15 Inverness Way East, Englewood, Colo., 80112 USA, E-Mail: global@ihs.com, Phone: +1-800-854-7179, Phone: +1-303-397-7956 (outside the U.S.), Fax: +1-303-397-2740.

Figure 1B:
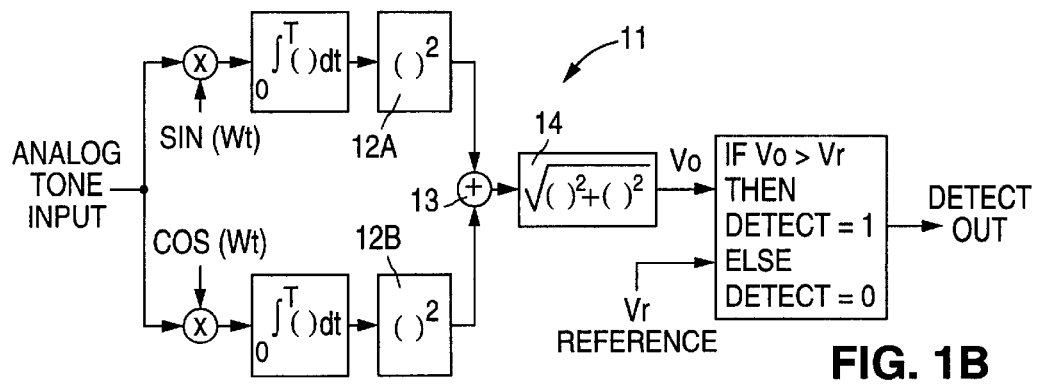
Figure 1C:
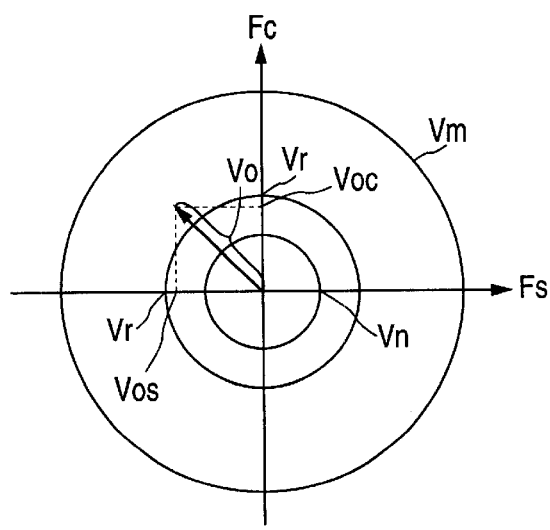
FIG. 1C illustrates, in a phase diagram, measurement of two components of the input signal by the circuit illustrated in FIG. 1B.

Note that the above-described comparison of convolution result directly with threshold T (in matcher 31) can fail to detect tone in an input signal I (FIG. 2C) when operations 32 and 33 are performed only once, because the convolution result Ii (illustrated as the component in the direction of reference signal Ri) is less than T. Note that according to the principles of the invention, the actual magnitude of input signal I is not being compared with threshold T as was done in the prior art (e.g. as described above in reference to FIG. 1B). However, tone is detected in accordance with the invention in many cases depending on the phase difference between the input signal and the reference signal. For example, tone is detected, as illustrated in FIG. 2C in the case when the input signal is J, because the component along reference signal Ri is Ji which is greater than T. Therefore, the above-described operations 32 and 33 result in the use of a rectangular box Bi (FIG. 2C) having a width 2T, to find tone present in input signal J which has in the axis of reference signal Ri a component Ji that exceeds threshold T (at the same time tone is not found in the case input signal is I, because I has a component Ii along reference signal Ri which is less than T).

Therefore, inside matcher 31 just a single component of an input signal I (along the reference signal Ri) is compared with the threshold in accordance with the invention. For example, the actual magnitude may even be greater than T, and yet input signal I is excluded when operations 32 and 33 are performed only once (in matcher 31), because component Ii along reference signal Ri is smaller than T (in an extreme case, input signal I may be oriented perpendicular relative to reference signal Ri, thereby resulting in zero value for component Ii, although the second component If is equal to I, and may even be greater than T). Note also that tone detector 26 does not combine two or more results of convolution of the input signal (obtained from reference signals of two or more phases, e.g. does not combine Ii and If illustrated in FIG. 2C) prior to comparison with threshold T. Instead, single phase reference matcher 31 performs in a single set of operations 33 and 34 (FIG. 2B) the convolution and threshold detection, to determine if there is a match between a reference signal Ri and input signal I (or J).

If there is no match in act 33, either of the above-described two techniques (i.e. phase shift and poly phase) can be used, with a reference signal having a different phase being used in the convolution. In the phase shift technique, tone detector 26 includes phase shifter 30 (which supplies the reference signal to single phase reference matcher 31). Phase shifter 30 delays reference signal Ri (in act 35 illustrated in FIG. 2B) by a delay duration Dt which is a predetermined fraction of the measuring period (e.g. ⅛ fraction; see FIG. 2E), thereby to introduce a phase shift Dp (e.g. π/8; see FIG. 2D) between an initial reference signal Ri and a current reference signal Rd. Such a phase shift rotates the original box Bi (FIG. 2C) used to detect tone, so that reference signal Rd is closer in phase to signal I, thereby to allow rotated box Bd (FIG. 2D) to now detect tone in signal I.

Figure 2D:
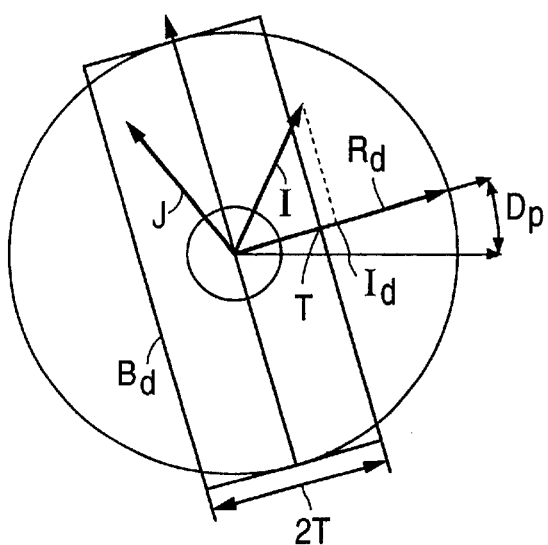
Figure 2F:
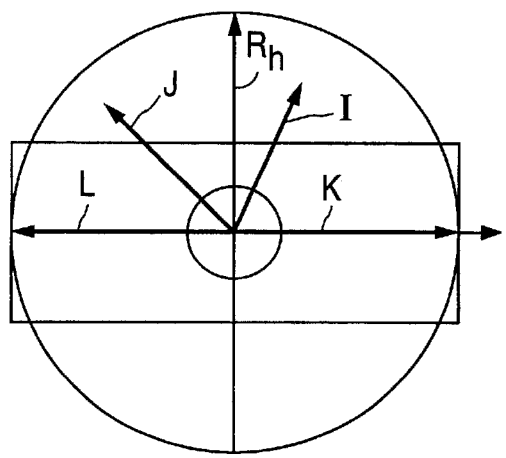
Figure 2E:
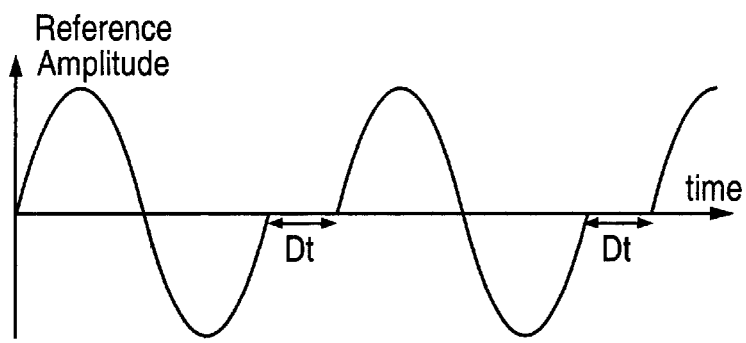
FIG. 2E illustrates, in a timing diagram, the delay of reference signal by duration Dt to introduce a phase shift therein.

Single phase reference matcher 31 performs the above-described operations 32 and 33 with a number of such delayed reference signals as often as necessary (e.g. eight times if the ⅛ fraction is used to determine delay duration Dt) to cycle through the entire measuring period, thereby to ensure that tone (if present in input signal I) is detected irrespective of phase, during one of the operations. For example, the component of an input signal along the reference signal is likely to cross one of eight boxes (to avoid redundancy only three such boxes are illustrated in FIGS. 2C, 2D and 2F, although a total of eight such boxes are used to cover 180° phase in the just-described example). FIG. 2F illustrates, in a phase diagram, relation between the various signals when the reference signal Rh is delayed half as much as the measurement period. The smaller the phase shift, the greater the number of times the convolution and threshold detection operations are repeated, and vice versa.

Figure 3A:
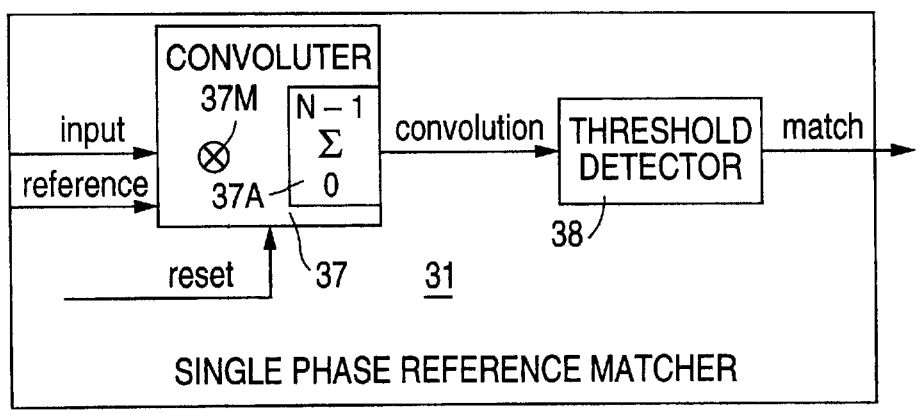
FIGS. 3A and 3B illustrate, in a low-level block diagram and a timing diagram respectively one implementation of the tone detector of FIG. 2A.
Figure 5A:
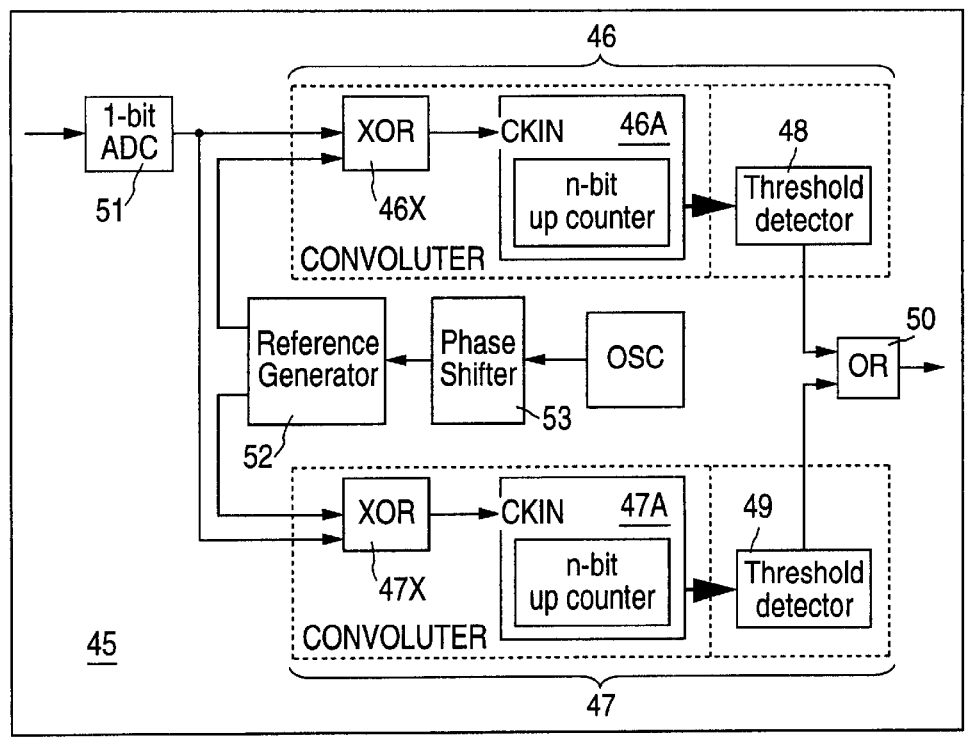
FIG. 5A illustrates, in an intermediate-level block diagram, a tone detector that includes a number of single phase reference matchers of the type illustrated in FIG. 2A.

In one embodiment, phase matcher 31 (FIG. 3A) includes a convoluter 37 that is coupled to analog-to-digital converter 25 (FIG. 2A) and also coupled to phase shifter 30 (FIG. 2A) to receive therefrom the input signal and the reference signal respectively. Convoluter 37 performs the convolution operation on these two signals, and supplies the output directly to threshold detector 38. Threshold detector 38 simply checks if the convolution exceeds a predetermined threshold. As discussed below, convoluter 37 may include a multiplier 37M (e.g. implemented by an exclusive NOR operation, as illustrated by gate 46X shown in FIG. 5A and described below) to perform multiplication of input signal with reference signal, and an accumulator 37A (e.g. implemented by a counter also as illustrated in FIG. 5A) to accumulate the signals generated by multiplier 37M. Note that in other embodiments, convoluter 37 (FIG. 3A) may have other components and yet obtain an approximation of the convolution of the input signal and the reference signal (such convoluters include, for example, prior art convoluters of the type described in any one or more of more of U.S. Pat. Nos. 5,274,579, 4,513,385, 5,850,438 and 4,302,817 each of which has been incorporated by reference above).

Figure 3B:
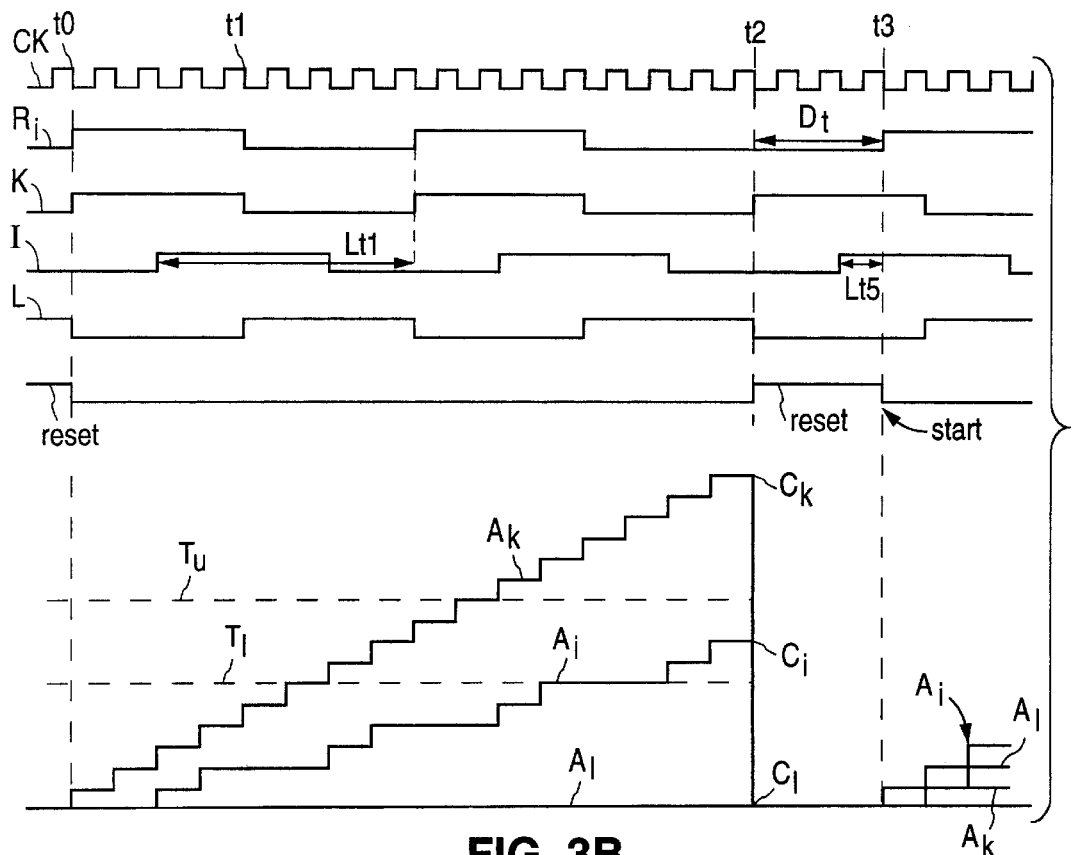

In the above-described example, the reference signal and the input signal each have one of the two logic values 0 and 1 as illustrated in FIG. 3B, and are generated as discussed below. Such digitization of a reference signal Ri of the type illustrated in FIG. 2E (which can also be approximated in another embodiment as suggested in U.S. Pat. No. 5,274,579 granted to Nelson et al.) allows the use of digital circuitry of the type described herein, and therefore reduces the cost. Note that the two-bit digitization illustrated in FIG. 3B reduces costs further as compared to the four-bit digitization described by Nelson et al.

In FIG. 3B, the input signal I goes active at time t0, and convoluter 37 increments a previous sum by 1 (as indicated by accumulation signal Ai). However, at time t1, the reference signal Ri goes inactive (see FIG. 3B), and convoluter 37 does not increment (and accumulation signal Ai remains constant), even though input signal I is active. In this manner, convoluter 37 increments the previous sum by 1 whenever the input signal I and the reference signal Ri have the same values (e.g. both 0 or both 1). At time t2, the accumulation signal Ai is supplied by convoluter 37 as the convolution result Ci to a threshold detector 38 that compares the convolution result Ci with a threshold, and drives a match signal active if the convolution result Ci has a greater value than upper threshold Tu or lesser value than lower threshold Tl. In the example illustrated in FIG. 3B, the signal Ci from convoluter 37 falls between lower threshold Tl and upper threshold Tu, and therefore detector 38 drives the match signal inactive.

If instead of input signal I, the input signal was K (see FIGS. 2F and 3B), then this input signal is in phase with the reference signal (i.e. there is zero phase difference), and the accumulation signal Ak grows at each rising edge of the clock signal CK, and therefore the convolution result Ck exceeds the upper threshold Tu, and therefore match signal goes active. In a similar way, when the input signal is signal L that is completely out of phase with the reference signal Ri (i.e. there is a 180° phase difference) then the accumulation signal Al remains unchanged (at zero) during the measurement interval, and the cumulation result Cl falls below the lower threshold Tl, and therefore match signal goes active.

The implementation discussed in the above-described example uses a one-way counter (such as an up counter) instead of a two-way counter (such as an up-down counter) to implement accumulator 37A. For example, an exclusive NOR operation that implements multiplier 37M supplies one of bits 1 and 0 to the one-way counter, depending on the values (which are also one of bits 1 and 0) of the input signal and the reference signal. A correspondence between the just-described implementation, and another implementation (based on a prior art convoluter as described above) which uses −1 and +1 values can be made as follows. Assume that N0 is the total number of samples (e.g. in our case N0=8192), C is the summation result when using −1 and +1, that the total +1s are P in number, and that the total −1s are Q in number, then:

$$P+Q=N0 \qquad (1a)$$

$$P-Q=C \qquad (1b)$$

In the above example, when using 1s and 0s instead of +1s and −1s, then the result of convolution is P (because the contribution from Q is zeroed out due to the 0 value being used). From the above equations:

$$P=(N0+C)/2 \qquad (2)$$

As N0 is a fixed number, C can be determined from P (which is the convolution result). The maximum value of C is +N0, and therefore Pmax=N0. The minimum value of C is −N0 and and Pmin=0. If C is determined in the +1 and −1 implementation to be ±2048 (from simulation), then a corresponding range for P is between 3072 and 5120 (from equation 2 discussed above). Therefore, when P falls between Tl (FIG. 3B) of 3072 and Tu (FIG. 3B) of 5119, the implementation determines that tone is not present in the input signal. When P≧5120 or P<3072, tone is determined to be present in the input signal.

In one implementation for an ADSL modem, a telephone line that carries the analog input signal has white noise of −140 dBm/Hz, and power of tone (when present) is −90 dBm/Hz. Using these criteria, simulation of single phase reference matcher 31 (FIG. 3A) indicates that a threshold of ±2048 provides a 99.9 percent detection of tone. For example, 5000 simulations with noise that 10× of the just-described white noise were run, and provided no false detects and there was no failure to detect tone.

Figure 3C:
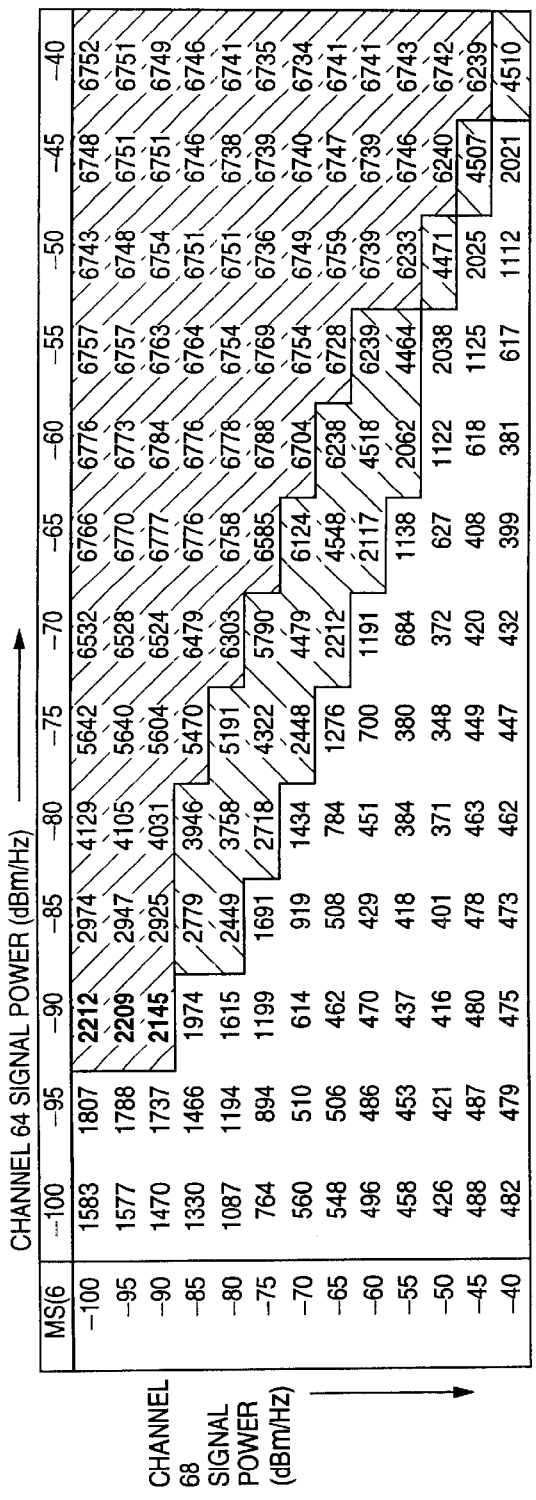
FIGS. 3C and 3D illustrate in tables the results of simulation of matcher 31 of FIG. 3A in the presence of white noise.
Figure 3D:
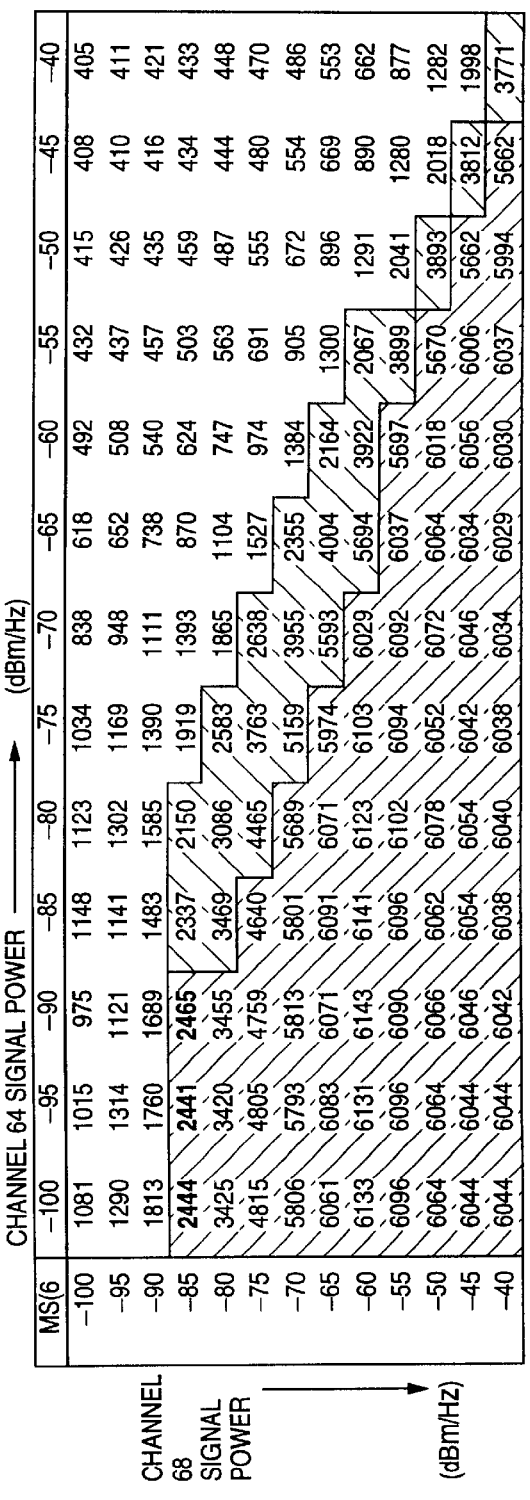

The results of simulation are illustrated in FIGS. 3C and 3D, wherein the input signal has (simultaneously) two channels (i.e. two tones are present, one in each of the two channels). In FIGS. 3C and 3D, the signal power for channel 68 is listed increasing in the y direction and the signal power for channel 64 is listed increasing in the x direction. Values in FIG. 3C represent the result of convolution (from convoluter 37) which detects channel 64 (reference signal is 276 kHz). Similarly, values in FIG. 3D represent the convolution results(from convoluter 37) which detects channel 68 (reference signal is 293 kHz). For example, the left-most column, bottom row in table of FIG. 3C is 482 which is the convolution result obtained from convolution of reference signal of frequency 276 kHz with the input signal having −40 dBm power in channel 68, and −100 dBm power in channel 64.

Figure 3E:
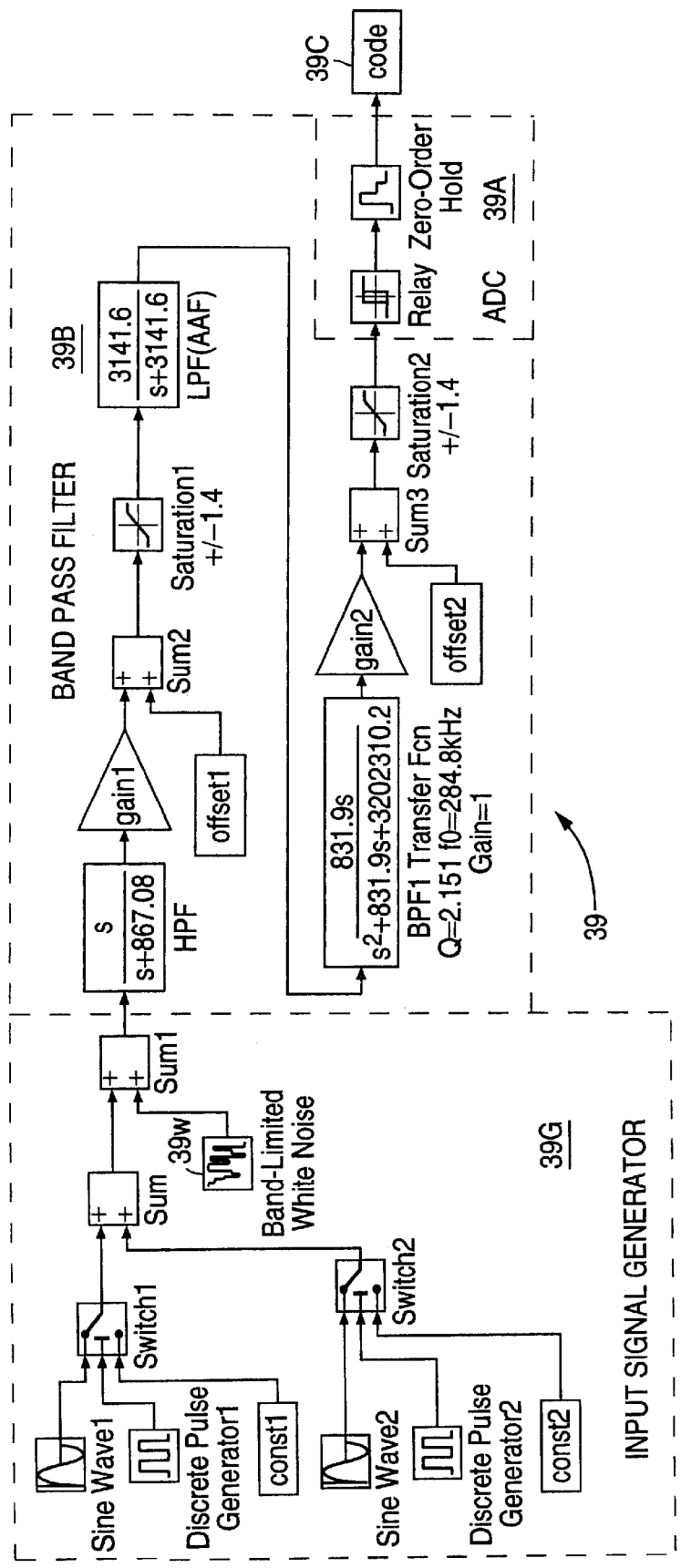
FIG. 3E illustrates, in a block diagram, a model used in simulating the matcher 31 of FIG. 3A.

For the simulations, an input signal generator 39G (FIG. 3E) generates the input signal having the two tones (supplied by switch1 and switch2 respectively) and white noise. The white noise is generated by a band-limited white noise generator 39w has bandwidth of 4 Mhz, and the noise power is 10 times the line noise (−140 dBm/Hz). Moreover, in the simulation results shown in FIGS. 3C and 3D, the signals in the two channels are in phase relative to each other. Simulation model 39 also includes a model 39B of band pass filter 23 (FIG. 2A), which has q of 2.151, and center frequency of 284.8 kHz, and gain in two stages of 1.0 and 50 respectively (illustrated in FIG. 3E as gain1 and gain2). Saturation of the gain stages is 1.4 volts.

The number of samples is 8192 (wherein 64 cycles of input signal are sampled, at a frequency of 128 samples per measurement period). Moreover, model 39A of the ADC 25 (FIG. 2A) is assumed to generate the two levels of +1 and −1 when voltage of the input signal crosses the respective limits of 0.001 volt and −0.001 volt. Model 39C for tone detector 26 is code written in a script language for software "MATLAB 5.0" available from Mathworks, Inc, 3 Apple Hill Drive, Natick, Mass. 1760-2098, phone 508-647-7000, and over the internet at www.mathworks.com.

In the example illustrated in FIG. 3B, at time t2, which is the end of the measuring period, the signal from comparator 38 remains inactive, and therefore no tone was detected during the first measuring period (i.e. tone was not found in signal I of FIG. 2C). At time t2, the reset signal goes active, thereby causing the accumulated sum to go to null. Thereafter, shifter 30 (FIG. 2A) imposes a delay on the reference signal for a period Dt, so that a delayed reference signal Rd (FIG. 2D) goes active at time t3 (FIG. 3B). Note that a lag time Lt5 between the delayed reference signal Rd and input signal I has reduced considerably (as compared to the lag time Lt1 between the initial reference signal Ri and the input signal I). Such reduction of lag time causes accumulator 37 to count up more often than in the pervious measuring period, thereby increasing the likelihood of the accumulated value Ai (FIG. 3B) exceeding the upper threshold Tu or falling below the lower threshold Tl.

Figure 4:
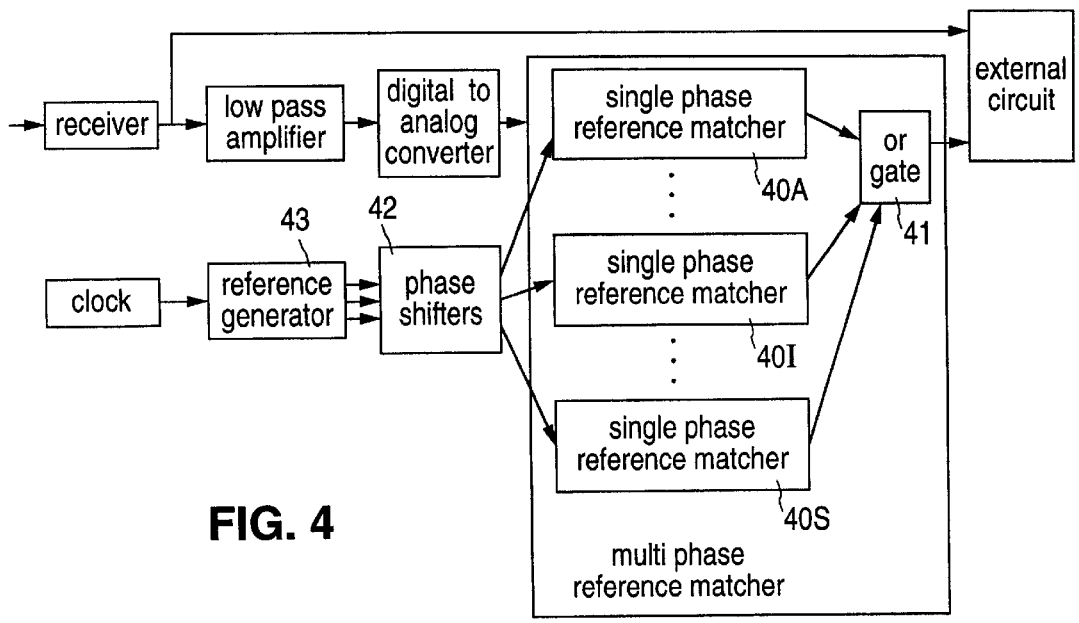
FIG. 4 illustrates, in a high-level block diagram, a multi phase reference matcher that includes a number of single phase reference matchers of the type illustrated in FIG. 2A.

Note that a tone detector of the type described herein can include a number of phase matchers 40A–40S (FIG. 4; wherein A<I<S, S being the total number of such detectors), each of which performs the above-described operation in parallel, thereby to reduce the total time required. In such a case, each of the "single phase reference matchers" (also called simply "phase matchers") has an input line coupled to an optional phase shifter 42 that in turn receives multiple reference signals from reference generator 43. Each reference signal generated by reference generator 43 has the same frequency and the same shape, but is displaced from another reference signal by a predetermined time period e.g. to produce a phase shift of $\pi/16$.

As before, phase shifter 42 does not introduce any phase shift during the first measurement period, and instead supplies all reference signals unchanged to the respective phase matchers 40A–40S. Only for a later measuring period does shifter 42 introduce a phase shift (in response to signal from a controller 44), and in doing so, shifts each reference signal by the same amount, e.g. $\pi/4$ (if there are four phase matchers). Therefore, controller 44 controls the phase shift timing of phase shifter 42. Each phase matcher 40I has its output line coupled to a common OR gate 41. OR gate 41 indicates presence of tone irrespective of which of the phase matchers 40A–40S found the tone.

In one implementation, a tone detector 45 (FIG. 5A) includes two phase matchers 46 and 47, so that all the operations (to cover a measuring period) are performed in half of the time required by having only one phase matcher (FIG. 2A). Each of matchers 46 and 47 includes a corresponding one of exclusive OR gates 46X and 47X that implement multiplication of the input signal and the reference signal, and supply the respective products to the respective accumulators 46A and 47A (that are implemented as up counters).

Note that although multiplication normally requires the exclusive NOR operation, an exclusive OR operation is used herein, but has the same effect as an exclusive NOR because the same results are obtained when the input signal and the reference signal are in phase with each other (e.g. phase difference is zero), and also when they are completely out of phase with each other (e.g. phase difference is 180°). Specifically, the exclusive OR operation results in 0 when both the input signal and the reference signal have the same value, and otherwise results in 1, and therefore use of exclusive OR operation results in counting the number of times the two signals are different, i.e. counts the Qs (as opposed to counting the number of times the two signals are same which counts the Ps as is done with an exclusive NOR operation).

In this implementation, there are two threshold detectors 48 and 49 that receive the convolution signals from the respective up counters 46C and 47C, and supply match signals to a common OR gate 50. Each of threshold detectors 48 and 49 may be implemented by the combination of a comparator and a storage element. Therefore, tone detector 45 includes two threshold detectors 48 and 49 (see FIG. 5A), although in the above-described prior art a single threshold detector is used. Note that two different threshold values can be applied by the respective threshold detectors 48 and 49 if desired, although a single threshold is used in both detectors in one implementation. In this implementation, the a/d converter 51 is a single bit device that produces a digital signal of logic level 1 if the analog input signal has a value greater than a predetermined value (e.g. value Vcc/2, wherein Vcc is the voltage for logic level 1 used in the chip), and otherwise produces a signal of level 0.

In this embodiment, reference generator 52 supplies the reference signals to each of matchers 46 and 47 in response to a signal supplied by phase shifter 53 that in turn is coupled to an oscillator (e.g. a clock source). Therefore, in this embodiment, the sequence of reference generation and phase shifting is reversed from the sequence illustrated in FIGS. 2A and 2B. The embodiment illustrated in FIG. 5A takes less gates, because a common phase shifter 53 is used.

Figure 5B:
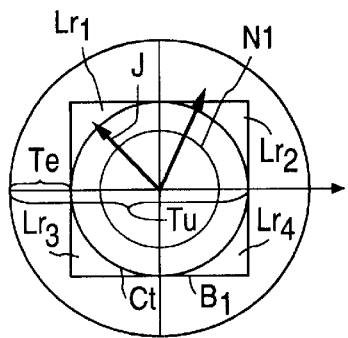
FIGS. 5B and 5C illustrate, in phase diagrams, the input signal and the thresholds, for two different noise levels.
Figure 5C:
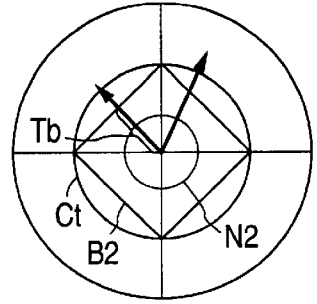

In the above-described embodiment, when using two phase matchers 46 and 47, direct comparison of convolution result (which represents a single component of the input signal which is in the direction of a reference signal) with the upper and lower thresholds can result in failure to detect tone in a signal J that falls in a loss region Lr1 formed in the region enclosed by box B1 (a square box in this example because the same thresholds Tl and Tu are used by each of the two phase matchers) but outside of the prior art threshold circle Ct (there are four such loss regions Lr1, Lr2, Lr3 and Lr4 when using two matchers). Note that tone in signal J is detected when using phase shift technique, e.g. with the two reference signals used in the matchers 46 and 47 being shifted in phase by $\pi/4$ (as compared to the corresponding previously-used reference signals), which results in a rotated box B2 as illustrated in FIG. 5C.

In one embodiment, the measuring period (FIG. 3B) is deliberately selected to be long enough (e.g. longer than the three cycles shown in FIG. 3B) to include a number "c" of cycles of the input signal (at the tone frequency), to reduce noise that would otherwise be present when using a measuring period that covers a single cycle. The number "c" is chosen to suppress the contributions of tone signals at adjacent frequencies, by selecting c to be some integer multiple of (Sf/Δf) where Δf is the difference between the tone frequency of interest and the nearest adjacent frequency at which another tone signal may be present, and Sf is the sampling frequency (which is the frequency of the clock signal illustrated in FIG. 3B and used to clock convoluter 37). Therefore $2^p \geq c$, wherein p is the number of single-bit storage elements in convoluter 37 used to hold the convolution.

For example, for ADSL, tone detection may be required at tone frequency "f(tone)" of 276 kHz and Δf between two adjacent tone signals of 4.3125 KHz, so that c is a multiple of 64 cycles (and if sampling frequency Sf is 35.382 Mhz, then the number of sampling points p=Sf/Δf=35382/4.3125= 8192 samples which are accumulated in each measuring period, thereby to require an accumulator having 13 bits; number of samples per cycle Sf/f(tone), e.g. 35328/276= 128, so that 128×64=8192 with the measuring period lasting for 64 cycles). Such a large measuring period (e.g. 64 cycles) results in a noise circle N2 (FIG. 5C) that is significantly smaller than the noise circle N1 (FIG. 5B) obtained by use of a single cycle measuring period. Such reduction of the noise circle allows the box B2 (FIG. 5C) to have a width Tb that is smaller than witdth Ta of box B1 (FIG. 5B), so much so that box B2 can be completely contained within the conventional threshold circle Ct. Such a completely contained box B2 eliminates the above-described loss regions. Note, however, that such loss regions can also be eliminated by rotating the box by use of multiple measuring periods of the type described above in reference to FIGS. 2C, 2D and 2F. In one embodiment that uses both techniques described above, the box is chosen to have a width between the two boxes B1 and B2.

In one implementation, a tone detector 60 detects the tone in two channels of an ADSL signal. Specifically, tone detector 60 includes two channel detectors 61 and 62 each of which receives a digitized input signal DIN, and detects the presence of tone at one of the two frequencies 276 Khz and 293 Khz. Tone detector 60 also includes a phase shifter 63 that initially supplies a signal without phase shift, and after a measurement period supplies a phase shifted signal to each of channel detectors 61 and 62. Channel detectors 61 and 62 supply the respective match signals (labeled "Pass1" and "Pass2" in FIG. 6A) to a gate 64 that supplies a combined signal to a flip flop 65 to indicate the presence of either or both of the two tone signals. Flipflop 65 is clocked by a signal "sample" that causes flip flop 65 to latch the signal from gate 64. Phase shifter 63 drives signal "sample" active at the end of a measurement period thereby to allow a stable signal "match" to be supplied by flipflop 65 to an external circuit.

In a first embodiment, gate 64 is a NOR gate that indicates the presence of either of the tone signals whereas in a second embodiment gate 64 is a NAND gate that indicates the presence of both tone signals. The first embodiment (using a NOR gate) can detect tone even if one of the two channels is noisy and tone is not detected in the noisy channel, because tone is detected in the other channel. The second embodiment eliminates false detects because tone must be present in both channels for the NAND gate to provide an active signal. The specific embodiment being used depends on the specific implementation, and in the ADSL modem implementation described herein, the first embodiment is used.

Note that each of items 61–63 operates in response to a clock signal CK that is supplied by a gate 66. Gate 66 (implemented by a NAND gate) receives the match signal and clock signal CK, and on detection of a tone signal suppresses the clock signal being supplied to items 61–63, thereby to avoid adding noise to the analog input signal being used by the external circuit. Note also that each of items 61–63 and 65 is reset by a signal RESETX, for example at the time of power on, or in response to the user operating a switch on an ADSL modem that includes tone detector 60.

Figure 6F:
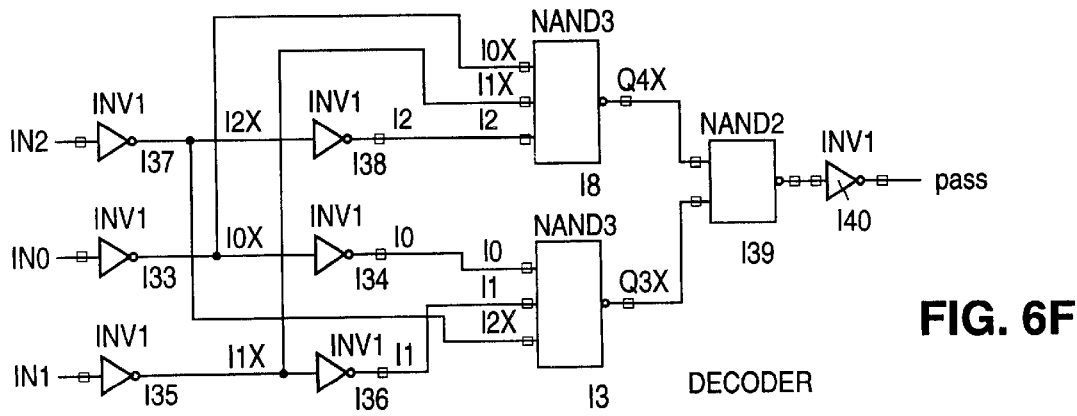
Figure 6A:
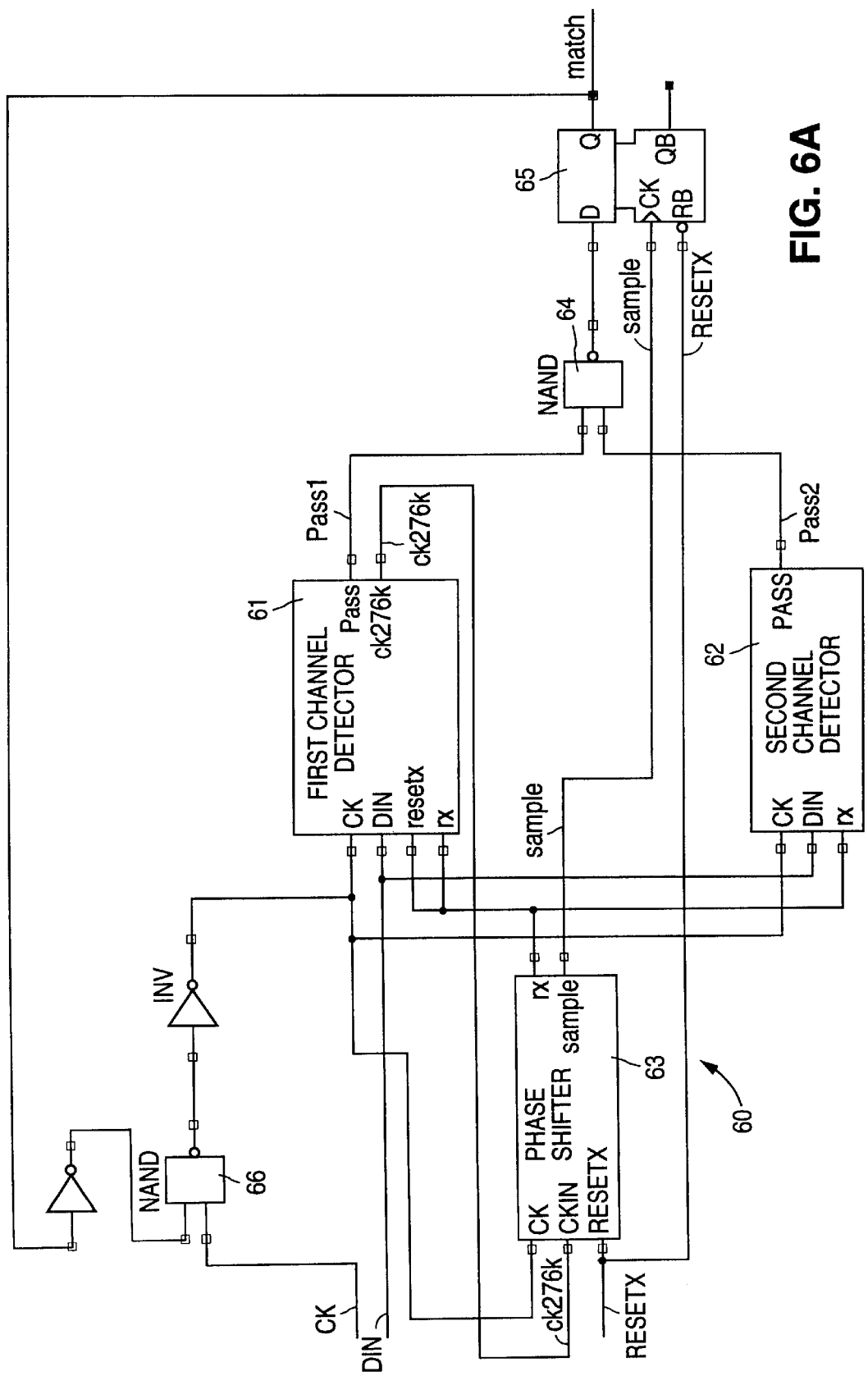
Figure 6B:
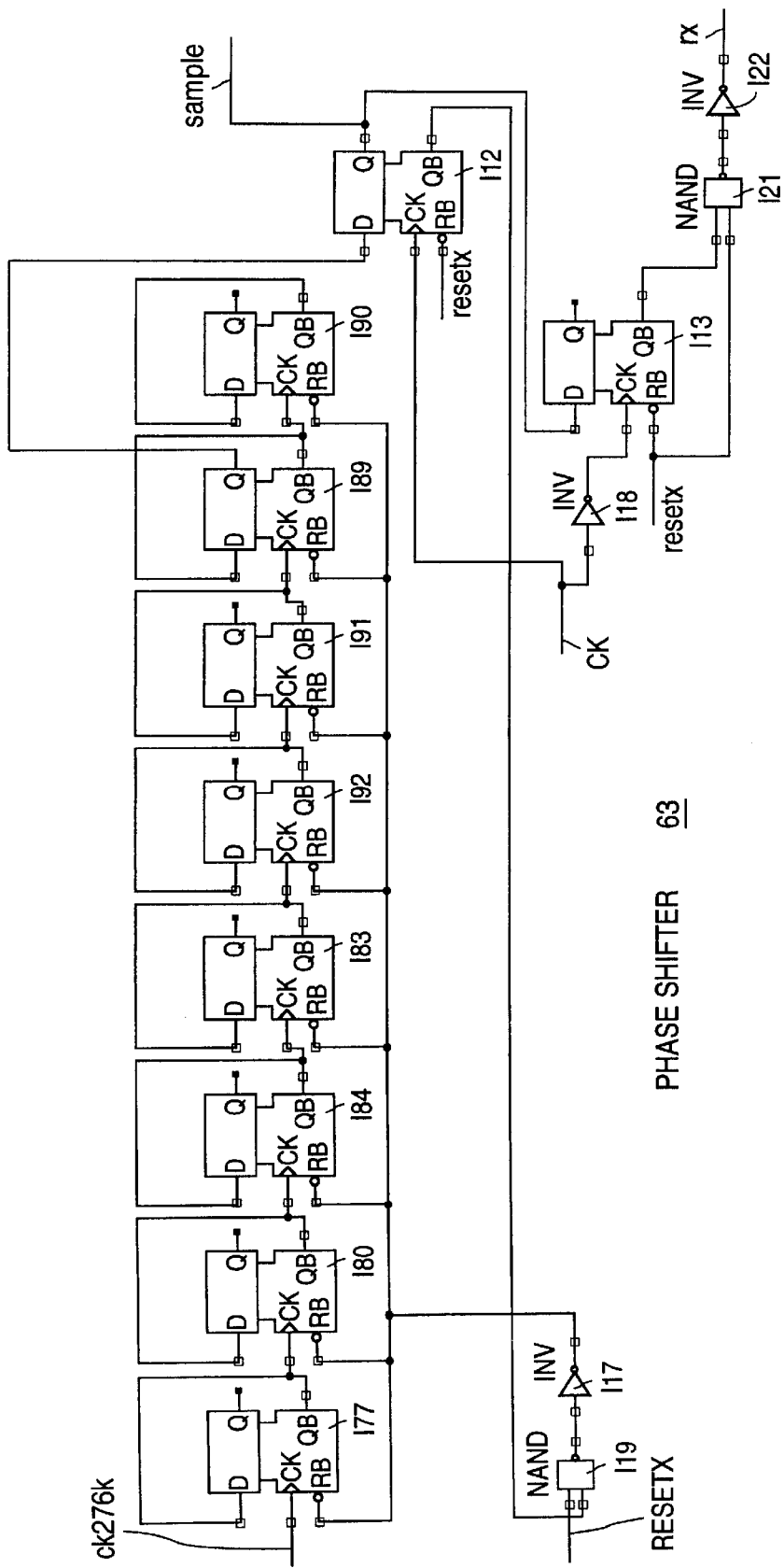

Phase shifter 63 implements the measurement interval t2-t0 (in FIG. 3B) for which the signal reset remains inactive, via flipflops as illustrated in FIG. 6B. Specifically, phase shifter 63 includes a number of flipflops I77, I80, I84, I83, I92, I91 and I89 (note that flipflop I90 is reserved for use in case the measurement interval needs to be increased), wherein each flipflop is clocked by an output signal from a preceding flipflop(at the negative output terminal QB). The negative output terminal QB of each flipflop is also coupled to its own data input terminal D, thereby to implement a 7 bit counter (as there are 7 flipflops illustrated in FIG. 6B). The positive output terminal Q of the last flipflop I89 (i.e. the output of the counter) is coupled to the data input terminal D of another flipflop I12. Flipflop I12 in turn supplies, at the positive output terminal Q, the sample signal that is used by flipflop 65 (described above in reference to FIG. 6A). Flipflops I12 and I13 implement a phase shift Dt (FIG. 3B) between two successive reference signals.

Figures 1, 6C:
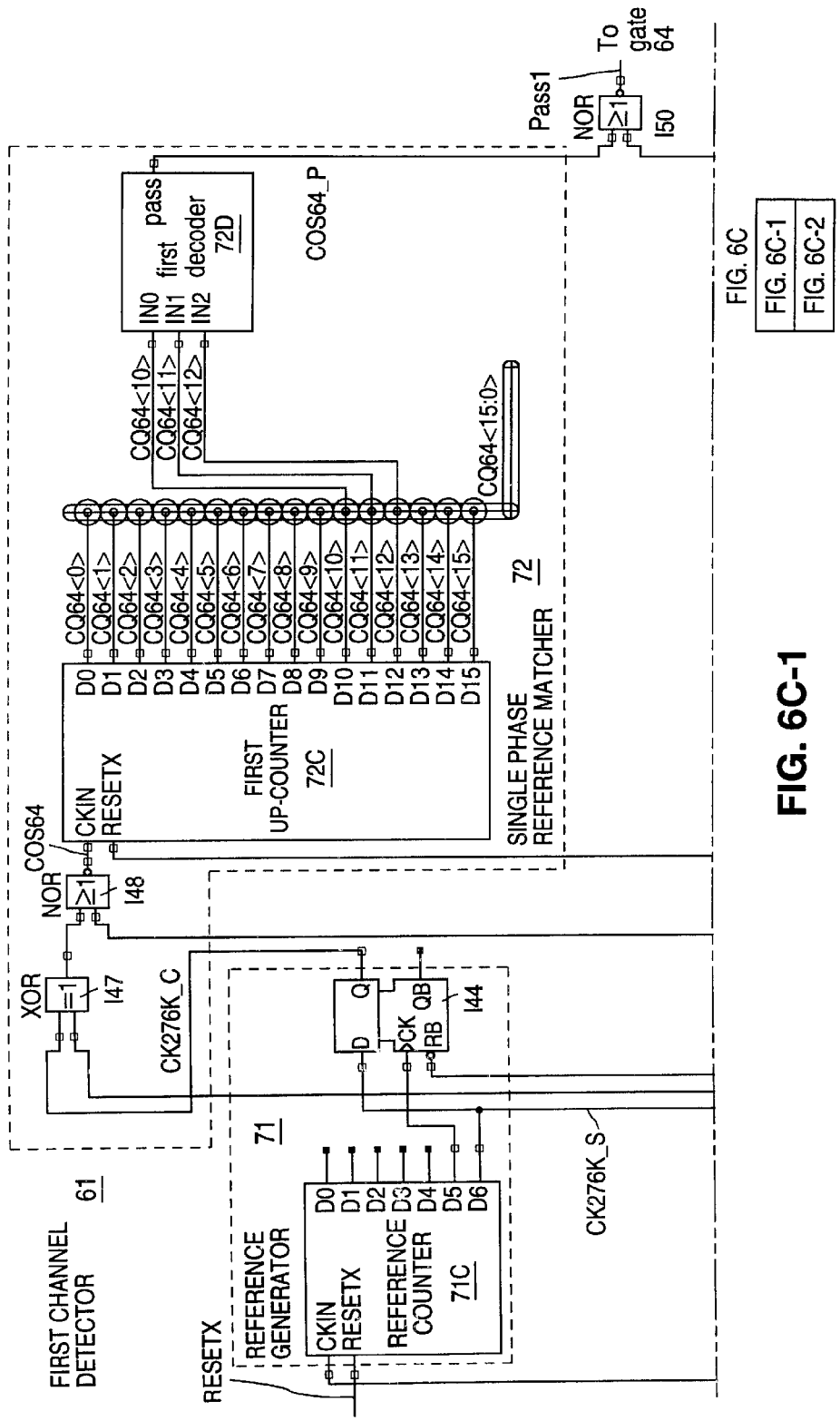
Figures 2, 6C:
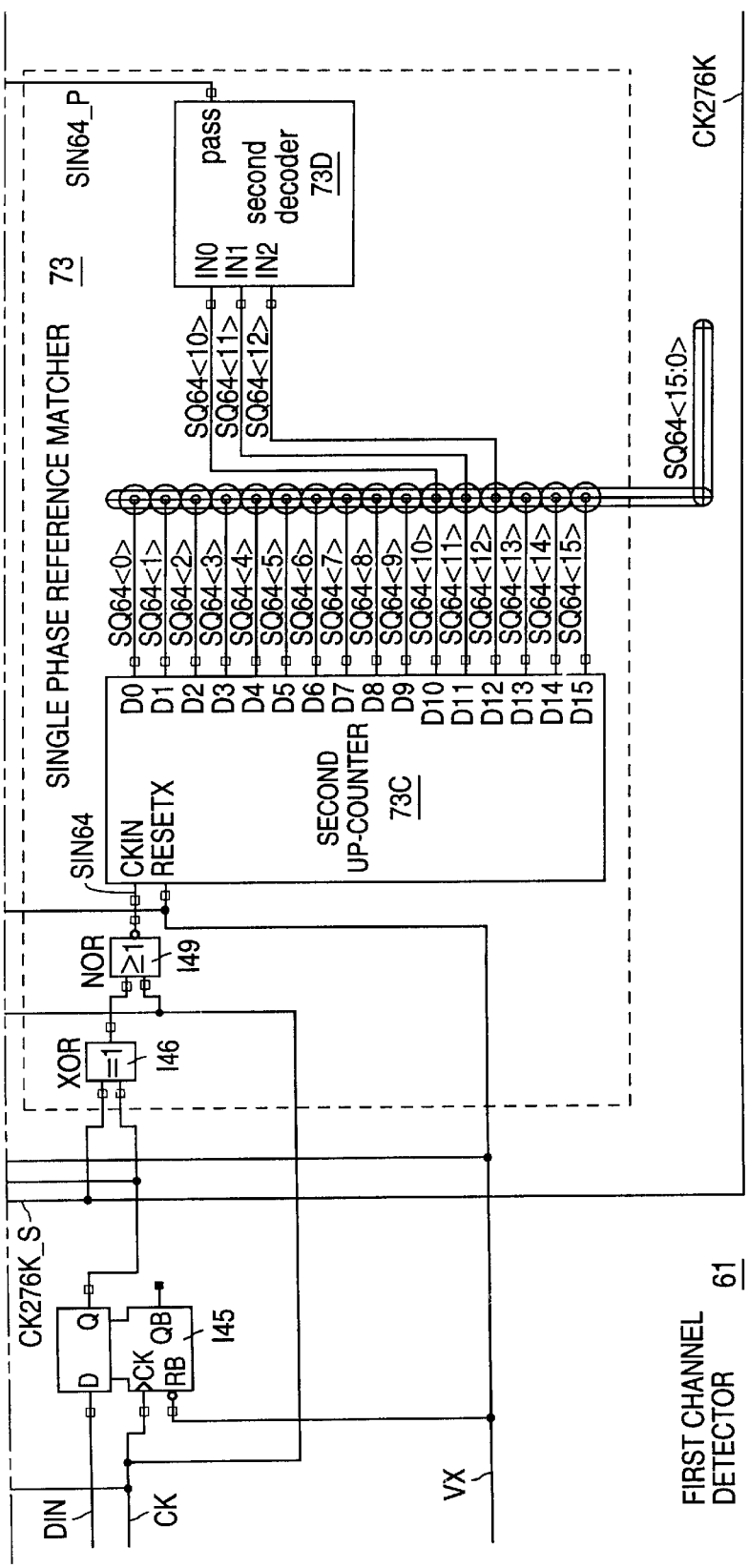
Figure 6D:
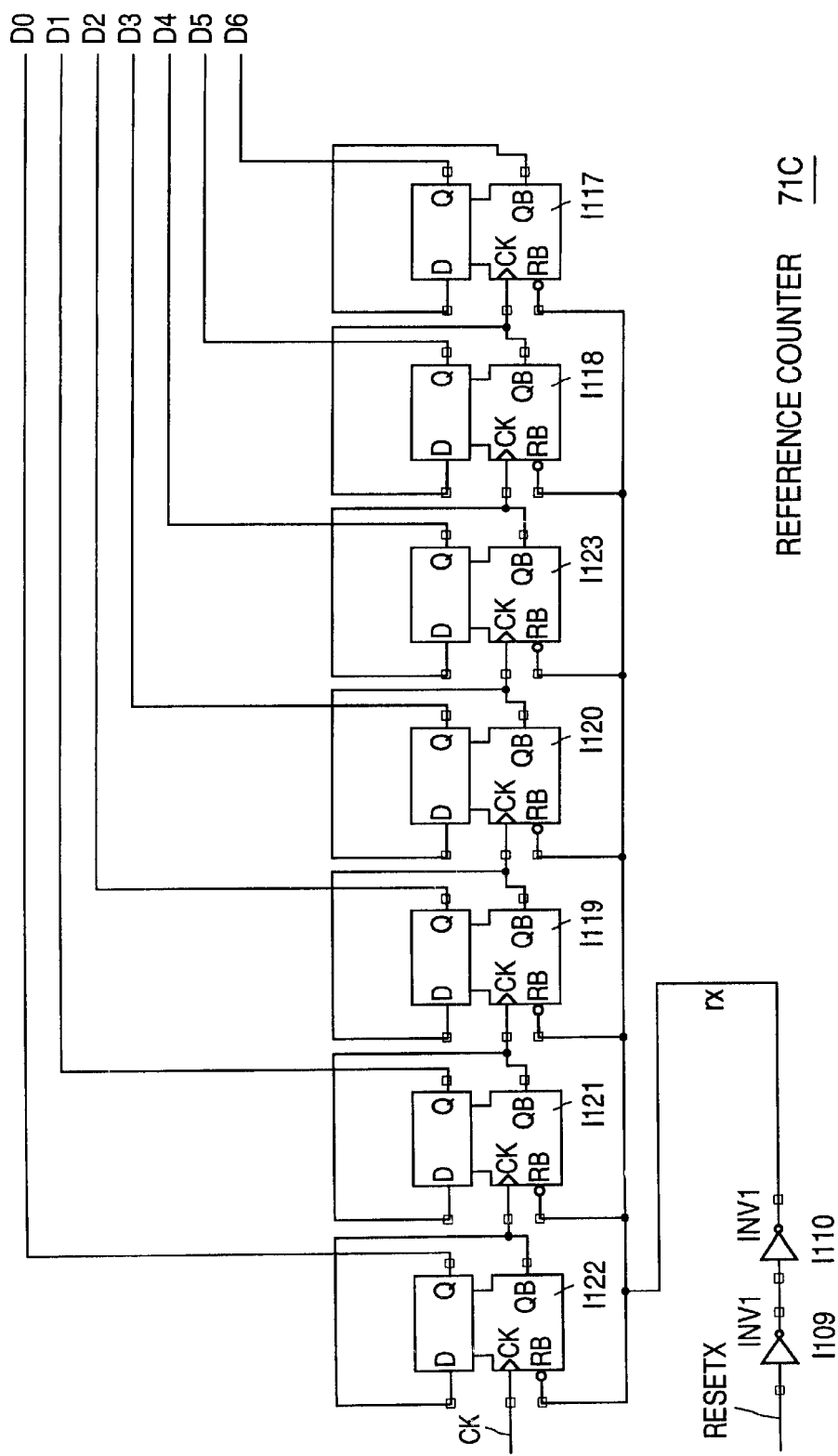
Figure 6E:
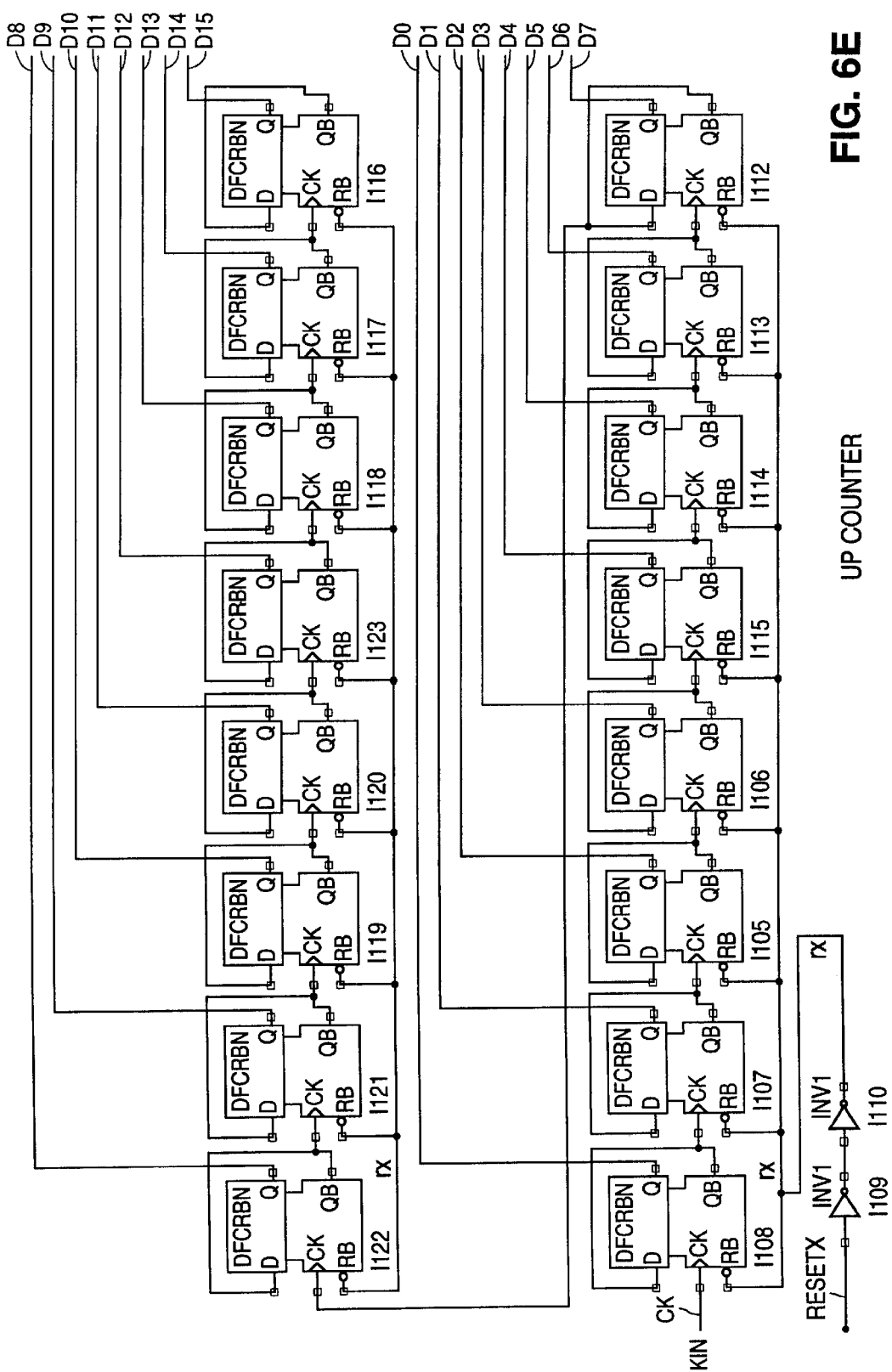
Figures 2, 6G:
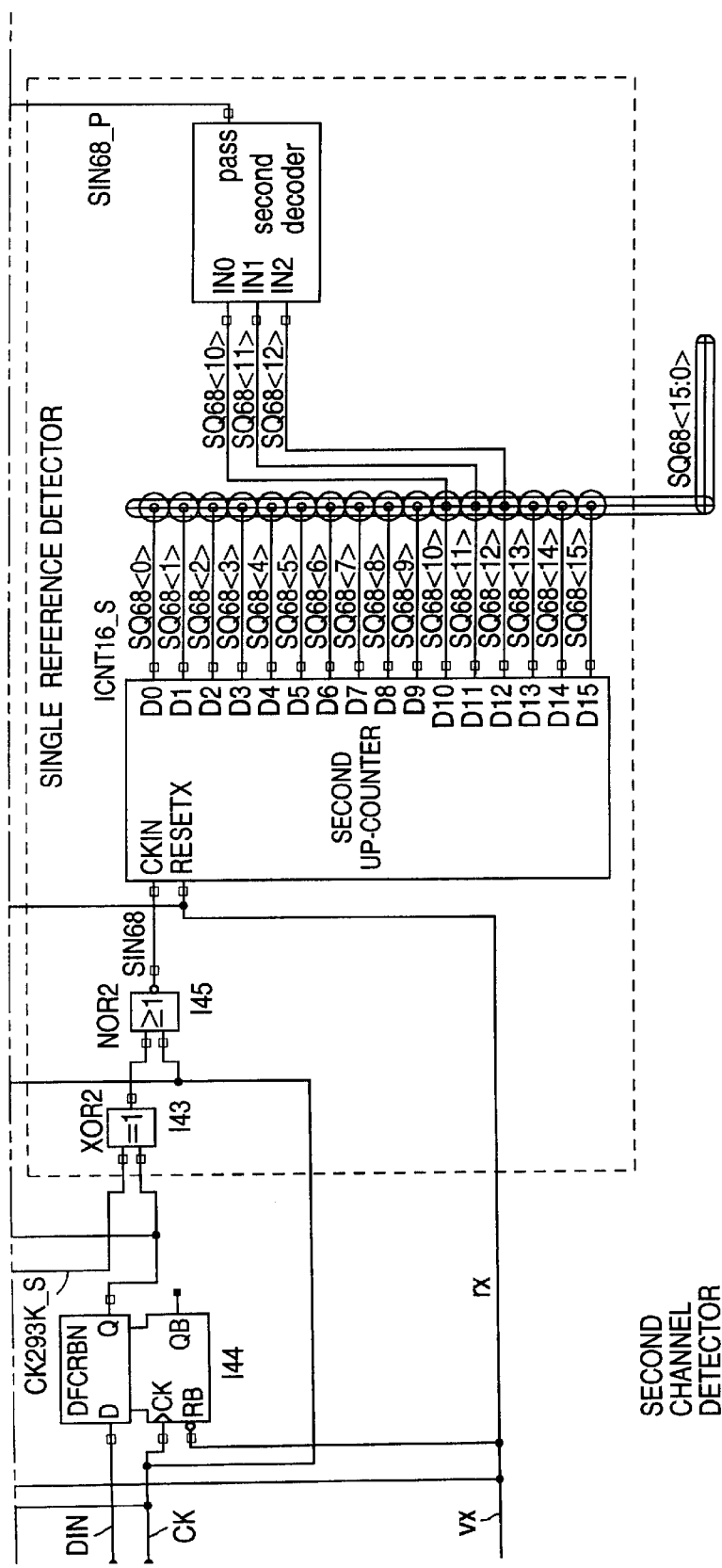

Note that each of channel detectors 61 and 62 can be implemented in a manner similar to each other, as illustrated in FIGS. 6C and 6G respectively. Note that the reference generators in FIGS. 6C and 6G have different counters, to generate reference signals of different frequencies. First channel detector 61 (FIG. 6C) includes a reference generator 71 that generates two reference signals CK276K_C and CK276K_S for use by the respective single phase reference matchers 72 and 73. Note that reference signals CK276K_C and CK276K_S differ in phase by π/2 in this implementation, although other phase differences (e.g. π/16) can be used in other embodiments. Depending on the implementation, phase shifter 63 (described above) needs to be set up to generate the appropriately delayed signal(s), depending on the phase difference between reference signals CK276K_C and CK276K_S. For example, in the implementation illustrated in FIG. 6C, phase shifter 63 merely cycles through the 180° phase, whereas with a phase difference of π/16, the entire 360° phase needs to be cycled through.

Referring to FIG. 6C, matchers 72 and 73 each supply the respective match signals (that are labeled "COS 64_P" and "SIN 64_P") to gate 150 (that is a NOR gate in this implementation), which in turn generates a signal "Pass1" for supply to gate 64 (as discussed above) when either of the two match signals is active (thereby to indicate that tone was found by matching the reference signal at one of two phases). Note that a flipflop I45 latches the input signal DIN, and supplies a constant output signal to each of matchers 72 and 73.

Reference generator 71 includes a reference counter 71C that is implemented by a number of flipflops I118–I123 (FIG. 6D) in the normal manner. Two output lines D5 and D6 (that are coupled to the last two flipflops) of reference counter 71 C (FIG. 6D) generate the reference signal for use by the respective matchers 72 and 73 (FIG. 6C). Note that output from the next-to-last flipflop, on line D5 is supplied as a clock signal to a flipflop I44 (FIG. 6C) that introduces a 90° phase delay in the reference signal CK276K_S received at the D input terminal, thereby to generate reference signal CK276K_C (which is supplied to matcher 72).

Each of matchers 72 and 73 includes an XOR gate (e.g. gates I47 and I46 respectively) that effectively performs multiplication of the input signal and the reference signal as described above in reference to FIG. 3A. Each XOR gate supplies the convolution signal to a respective one of up counters 72C and 73C for accumulation also as described above in reference to FIG. 3A. Note that in this particular implementation, the convolution signal from XOR gates I46 and I47 is passed through a respective one of NOR gates I48 and I49 (illustrated in FIG. 6C) to disable operation of the respective counters 72C and 73C when the result of the XOR gate is 1. When the result is 0, the clock signal CK is passed through by NOR gates I48 and I49, and causes counters 72C and 73C to increment the previous values. Each of counters 72C and 73C is implemented by flipflops in the normal manner, as illustrated in FIG. 6E. Note that there are sufficient number of flipflops (in this example there are sixteen) to allow accumulation of the convolution signal over the entire measurement period, which is related to the difference in frequency between the tone frequency and the nearest adjacent frequency as described herein.

Each of matchers 72 and 73 also includes a threshold detector (implemented by the respective decoders 72D and 73D) that is directly coupled to a respective one of counters 72C and 73C, thereby to check if a component of the input signal along the reference signal exceeds a threshold (instead of combining the two components as is done in the prior art as described above). In this implementation, each of decoders 72D and 73D is implemented as illustrated in FIG. 6F, by a number of inverters and gates that check if certain predetermined bits of the convolution signal have the logic value 1, and if so drive the signal "pass" active. For example, bits 10–12 (on lines D10–D12) generated by counters 72C and 73C are checked for active signals, by decoders of the type illustrated in FIG. 6F. The checking of predetermined bits as described herein can be replaced by a comparator that compares the complete signal generated by a counter against a threshold value, although such a comparator is less efficient than a decoder of the type illustrated in FIG. 6F.

As noted above, second channel detector 62 is implemented as illustrated in FIG. 6G in a manner similar to the implementation of channel detector 61 FIG. 6C (described above). FIG. 6H illustrates circuitry used to implement a reference generator of the type illustrated in FIG. 6G.

Numerous modifications and adaptations of the embodiments described herien will be apparent to the skilled artisan in view of the disclosure. Therefore, various such modifications and adapatations are encompassed by the attached claims.

What is claimed is:

1. A tone detector for detecting presence of tone at a predetermined frequency in an input signal, the tone detector comprising:
   a reference generator that generates a reference signal at said predetermined frequency, the reference generator having a first reference output line for carrying the reference signal; and
   a first single phase reference matcher having a first input port for carrying the input signal and a second input port coupled to the reference output line to receive the reference signal therefrom, the first single phase reference matcher having a first match output line for carrying thereon an active signal when convolution of the reference signal and the input signal exceeds a predetermined threshold;
   wherein:
      the reference generator has a second reference output line for carrying another reference signal that is shifted in phase relative to said reference signal;
      the tone detector further comprises a second single phase reference matcher, the second single phase reference matcher being coupled to receive said input signal, the second single phase reference matcher having a second match output line; and
      the tone detector further comprises an OR gate coupled to each of the first match output line and the second match output line.

2. The tone detector of claim 1, further comprising:
   a phase shifter that changes phase of the reference signal by different amounts in a plurality of successive measurement intervals.

3. The tone detector of claim 2 wherein:
   the number of successive measurement intervals is s; and
   the phase shifter changes phase of the reference signal by $\pi/s$ between each successive measurement interval.

4. The tone detector of claim 1, wherein said first single phase reference matcher includes a first threshold detector having a first comparator and a first storage element, and said second single phase reference matcher includes a second threshold detector, said second threshold detector having a second comparator and a second storage element.

5. The tone detector of claim 4, wherein said first threshold detector is used to detect a first threshold value, said second threshold detector is used to detect a second threshold value; and further wherein said first threshold value and said second threshold value are different.

6. The tone detector of claim 5, wherein a measuring period used by the tone detector includes a number of cycles c of the input signal, where c>1.

7. The tone detector of claim 1, wherein the tone detector detects a presence of a tone in two different frequencies of the input signal.

8. The tone detector of claim 7, wherein said two different frequencies correspond to separate subchannels of an xDSL based input signal.

9. The tone detector of claim 7, wherein the tone detector selectively generates an output indicative of the presence of a tone at either or both of said two different frequencies.

10. A tone detector for detecting presence of tone at a predetermined frequency in an input signal, the tone detector comprising:
    a reference generator that generates a reference signal at said predetermined frequency, the reference generator having a first reference output line for carrying the reference signal; and
    a first single phase reference matcher having a first input port for carrying the input signal and a second input port coupled to the reference output line to receive the reference signal therefrom, the first single phase reference matcher having a first match output line for carrying thereon an active signal when convolution of the reference signal and the input signal exceeds a predetermined threshold;
    wherein:
       the reference generator has a second reference output line for carrying another reference signal that is shifted in phase relative to said reference signal;
       the tone detector further comprises a second single phase reference matcher, the second single phase reference matcher being coupled to receive said input signal, the second single phase reference matcher having a second match output line; and the tone detector further comprises an OR gate coupled to each of the first match output line and the second match output line;

further wherein each of the first single phase reference matcher and the second single phase reference matcher includes:

a multiply and accumulate circuit having a convolution output port; and a threshold detector having an input port connected directly to the convolution output port.

11. A tone detector for detecting presence of tone at a predetermined frequency in an input signal, the tone detector comprising:

a reference generator that generates a reference signal at said predetermined frequency, the reference generator having a reference output line for carrying the reference signal; and a single phase reference matcher having a first input port for carrying the input signal and a second input port coupled to the reference output line to receive the reference signal therefrom, the single phase reference matcher having a match output line for carrying thereon an active signal when convolution of the reference signal and the input signal exceeds a predetermined threshold; and a phase shifter that changes phase of the reference signal by different amounts in a plurality of successive measurement intervals s;

wherein:
the number of single phase reference matchers is m;
the phase shifter changes phase of the reference signal (s/m) times.

12. The tone detector of claim 10, wherein said phase shifter does not change a phase of the reference signal during an initial measurement interval but only during said plurality of successive measurement intervals.

13. A tone detector for detecting presence of tone at a predetermined frequency in an input signal, the tone detector comprising:

a reference generator that generates a reference signal at said predetermined frequency, the reference generator having a reference output line for carrying the reference signal; and a single phase reference matcher having a first input port for carrying the input signal and a second input port coupled to the reference output line to receive the reference signal therefrom, the single phase reference matcher having a match output line for carrying thereon an active signal when convolution of the reference signal and the input signal exceeds a predetermined threshold; and wherein the reference generator has a clock input terminal, the tone detector further comprising:

a storage element coupled to the match output line, the storage element having a control terminal; and a phase shifter having a first output line coupled to the clock input terminal of the reference generator, and a second output line coupled to the control terminal of the storage element, wherein:

the phase shifter delays a clock signal supplied to the first output line by a first fraction of a predetermined period, said predetermined period being inverse of said predetermined frequency, and after passage of a measurement interval, the phase shifter delays the clock signal by a second fraction of said measurement interval thereby to introduce a phase shift between reference signals generated during and after said measurement interval; and the phase shifter drives to active state a control signal supplied to the second output line at the end of said measurement interval.

14. A tone detector for detecting presence of tone at a predetermined frequency in an input signal, the tone detector comprising:

a reference generator that generates a reference signal at said predetermined frequency, the reference generator having a reference output line for carrying the reference signal; and a single phase reference matcher having a first input port for carrying the input signal and a second input port coupled to the reference output line to receive the reference signal therefrom, the single phase reference matcher having a match output line for carrying thereon an active signal when convolution of the reference signal and the input signal exceeds a predetermined threshold; and wherein the reference generator has a clock input terminal, the tone detector further comprising:

a storage element coupled to the match output line, the storage element having a control terminal; and a phase shifter having a first output line coupled to the clock input terminal of the reference generator, and a second output line coupled to the control terminal of the storage element, wherein:

the phase shifter delays a clock signal supplied to the first output line by a first fraction of a predetermined period, said predetermined period being inverse of said predetermined frequency, and after passage of a measurement interval, the phase shifter delays the clock signal by a second fraction of said measurement interval thereby to introduce a phase shift between reference signals generated during and after said measurement interval; and the phase shifter drives to active state a control signal supplied to the second output line at the end of said measurement interval;

further wherein the first fraction is zero and the first phase shift is zero; and the second fraction is 1/s and the second phase shift is $\pi/s$.

15. A method for detecting presence of tone at a predetermined frequency in an input signal, the method comprising:

generating a first reference signal at said predetermined frequency; and detecting tone in an input signal when convolution of the input signal with a first reference signal at a predetermined frequency and of a first predetermined phase exceeds a predetermined threshold;

performing convolution of the input signal with a second reference signal at said predetermined frequency and of a second predetermined phase; and said detecting including performing an OR operation on a first result of comparison of convolution of the input signal with the first reference signal and a second result of comparison of convolution of the input signal with the second reference signal.

16. The method of claim 15, wherein a first threshold is used for comparing said convolution of the input signal and the first reference signal, and a second threshold is used for comparing said convolution of the input signal and the second reference signal; and further wherein said first threshold and said second threshold are different.

17. The method of claim 15, wherein a measuring period used for detecting presence of the tone includes a number of cycles c of the input signal, where c>1.

18. The method of claim 15, further including a step of detecting a presence of a tone in two different frequencies of the input signal.

19. The method of claim 18, wherein said two different frequencies correspond to separate subchannels of an xDSL based input signal.

20. The method of claim 18, further including a step of generating an output during said detecting step that is indicative of the presence of a tone at either or both of said two different frequencies.

* * * * *